(12) United States Patent
Jameson

(10) Patent No.: US 7,496,601 B2
(45) Date of Patent: Feb. 24, 2009

(54) COLLECTION COMMAND APPLICATOR

(75) Inventor: Kevin Wade Jameson, Calgary (CA)

(73) Assignee: Coverity, Inc., San Francisco, CA (US)

( * ) Notice: Subject to any disclaimer, the term of this patent is extended or adjusted under 35 U.S.C. 154(b) by 318 days.

(21) Appl. No.: 11/129,678

(22) Filed: May 13, 2005

(65) Prior Publication Data

US 2005/0273397 A1    Dec. 8, 2005

Related U.S. Application Data

(63) Continuation of application No. 09/885,081, filed on Jun. 21, 2001, now Pat. No. 6,917,947.

(51) Int. Cl.
*G06F 17/30* (2006.01)
*G06F 7/00* (2006.01)
*G06F 9/44* (2006.01)

(52) U.S. Cl. .............. 707/104.1; 707/6; 717/101; 717/120

(58) Field of Classification Search ............. 707/104.1, 707/6; 717/101, 120
See application file for complete search history.

(56) References Cited

U.S. PATENT DOCUMENTS

| | | | | |
|---|---|---|---|---|
| 5,953,720 A | * | 9/1999 | Mithal et al. ............. | 707/10 |
| 6,357,038 B1 | * | 3/2002 | Scouten .................... | 717/122 |
| 6,442,619 B1 | * | 8/2002 | Ouellette ................... | 719/316 |
| 6,456,308 B1 | * | 9/2002 | Agranat et al. ............ | 715/854 |
| 6,460,036 B1 | * | 10/2002 | Herz ........................ | 707/10 |
| 6,493,711 B1 | * | 12/2002 | Jeffrey ...................... | 707/5 |
| 6,493,739 B1 | * | 12/2002 | Dolin et al. ................ | 718/102 |
| 6,505,209 B1 | * | 1/2003 | Gould et al. ............... | 707/102 |
| 6,601,067 B1 | * | 7/2003 | Hiyoshi ..................... | 707/7 |
| 6,768,989 B2 | * | 7/2004 | Jameson .................... | 707/3 |
| 2002/0001302 A1 | * | 1/2002 | Pickett ...................... | 370/352 |

* cited by examiner

*Primary Examiner*—Kuen S Lu
(74) *Attorney, Agent, or Firm*—Schwegman, Lundberg & Woessner, P.A.

(57) ABSTRACT

Collection command applicators improve the productivity of human knowledge workers by enabling them to automatically process of large numbers of collections of arbitrary computer files. In operation, collection command applicators dynamically recognize interesting collections, calculate an optimal execution dependency visit order, determine an optimal parallel execution order, and apply arbitrary computer commands to the recognized collections in accordance with the calculated execution orderings. Collection command applicators thereby make it possible to process large numbers of collections in automated, scalable ways that were not previously possible.

14 Claims, 29 Drawing Sheets

FIG. 1
PRIOR ART
```
1    c:\collections
2       notes.txt
3       myletter.doc
4       c-myhomepage
5
6          s
7             homepage.html
8             myphoto.jpg
```
FIG. 2
```
1    c:\collections
2       notes.txt
3       myletter.doc
4       c-myhomepage
5          cspec
6          s
7             homepage.html
8             myphoto.jpg
```
FIG. 3
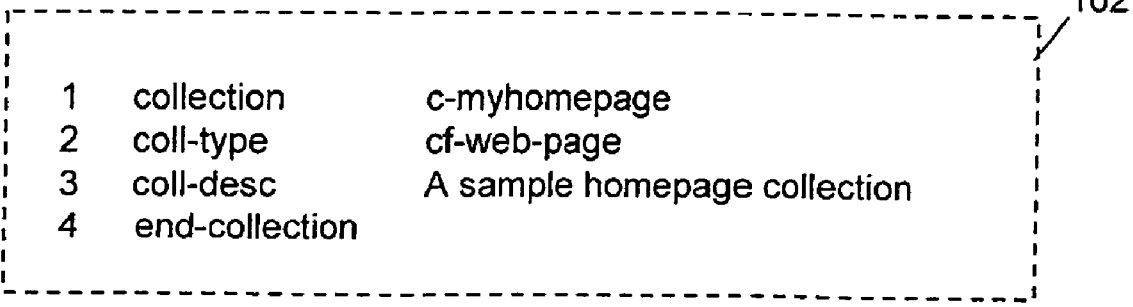
```
1    collection      c-myhomepage
2    coll-type       cf-web-page
3    coll-desc       A sample homepage collection
4    end-collection
```

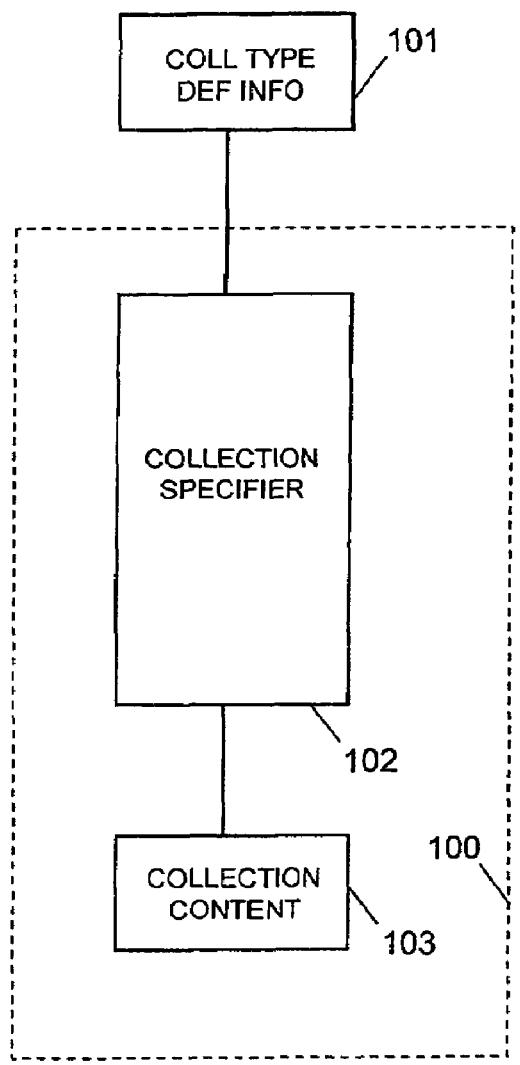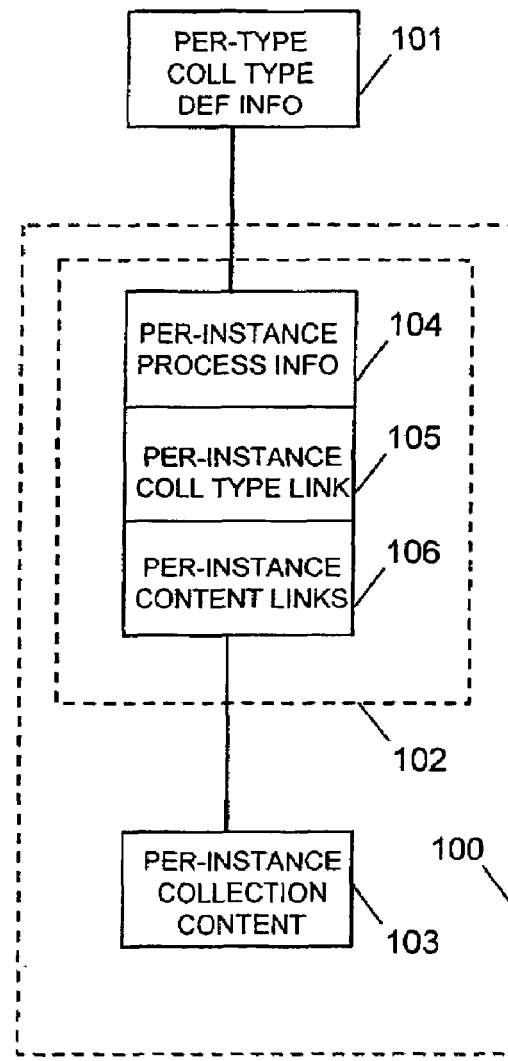

FIG. 8

```
1   /* collection data structure */
2   collection-info {

3     + specifier_info
4         + coll-type-indicator
5         + other specifier information ...

6     + content_info
7         + content_location_info ...
8         + content_members ...
9         + other content information...

10    + other collection structure information...
11  }
```

FIG. 9

```
1   /* collection type definition data structure */
2   collection-type-definition-info {

3     + coll-type-name
4     + collection internal structure info ...
5     + collection content location info ...
6     + collection content type recognition info ...

7     + other collection type definition information...
8   }
```

FIG. 10

| KEY | VALUE | | |
|---|---|---|---|

1  /* collection type internal structure definitions */
2  dir_source_files      .\s
3  dir_doc_files         .\doc 4  /* content location definitions (per-type content links) */
5  content_subtree_http  http://host.com/some/dir/name
6  content_subtree_ftp   ftp://host.com/some/dir/name
7  content_subtree_nfs   /some/local/directory/name 8  /* content type recognition definitions */
9  content_policy        subtree_below_cspec_file
10 content_file_type     .c     file_cpp
11 content_file_type     .c     file_c
12 content_file_type     .h     file_c_include
13 content_file_type     .doc   file_ms_word
14 content_file_type     .html  file_html
15 content_file_type     .xls   file_ms_excel 16 /* collection processing definitions */
17 compile_c_files       yes
18 compiler_windows      vc++
19 compiler_unix         gcc
20 build platforms       Win98, Win2000, linux
21 process files         compile link
22 link libraries        stdio math sock 23 /* results dispatching definitions */
24 results_ftp_host      ftp.output.com
25 results_ftp_dir       c:\ftphome\collection\results

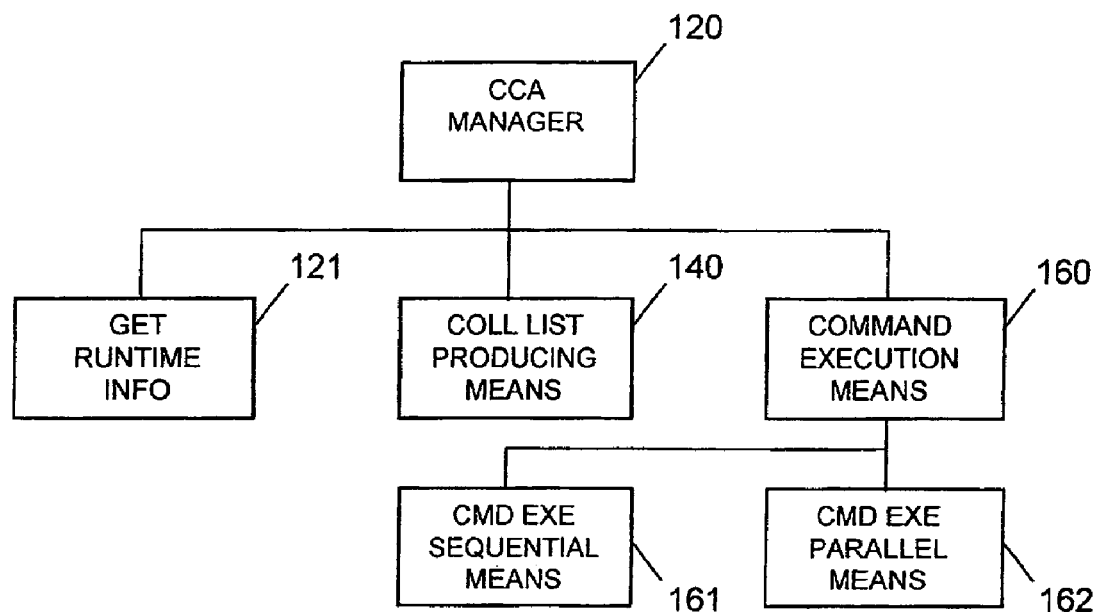

FIG. 12

1 /* simplified cca algorithm */

2 Call get runtime information to obtain a list of commands to apply

3 Call collection list producing means to obtain a list of target collections for command application 4 Call command execution means to apply commands to target collections

FIG. 13

1 /* runtime information data structure */
2 runtime-info {

3   + invocation options
4   + runtime environment information
5   + commands to execute on recognized collections
6   + collection recognition criteria

```
1   /* simplified algorithm for list producing means */
2   Build data structures 3   /* Obtain list of target collections for command application */
4   - add explict invocation-provided collections to list
5   - add collection-recognizer-provided collections to list
6   - add collections from other sources to list 7   /* Build sorted-colls data structures */
8   - create list of target collections sorted alphabetically
9   - create list of target collections sorted by visit order
10  - create list of target collections sorted by other means 11  Return completed coll-list-info data structure to caller
```

FIG. 16

```
1  /* list of target collections for command application */
2  target-coll-list {

3    + list of collection-structures (eg FIG 8)

```
1  /* structure for holding sorted lists of collections */
2  sorted-colls {

3    + sort-type = ALPHA, VISIT_ORDER, ...
4    + sorted-collection-set {
5        + coll-1 in sort order
6        + coll-2 in sort order
7        + ...

```
1  /* structure for holding collection list info */
2  coll-list-prod-info {

3    + list of collection structures (target-coll-list)
4    + list of collection type definition structures (FIG 9)
5    + list of sorted-colls structures
6    + collection recognition info ...

| | |
|---|---|
| 1 | c:\collections |
| 2 |    programs |
| 3 |       helloworld |
| 4 |          c-hello-library |
| 5 |          c-hello |
| 6 |    c-myprogram |
| 7 |    parts |
| 8 |       c-include-files |
| 9 |       c-library-one |
| 10 |       c-library-two |
| 11 |    webstuff |
| 12 |       c-myhomepage |
| 13 |    c-myphotos |

FIG. 20

| | |
|---|---|
| 0 | /* File colls-fig-20.txt holds list of collections for tree FIG 19 */ |
| 1 | c:\collections\programs\helloworld\c-hello-library |
| 2 | c:\collections\programs\helloworld\c-hello |
| 3 | c:\collections\c-myprogram |
| 4 | c:\collections\parts\c-include-files |
| 5 | c:\collections\parts\c-library-one |
| 6 | c:\collections\parts\c-library-two |
| 7 | c:\collections\webstuff\c-myhomepage |
| 8 | c:\collections\c-myphotos |

FIG. 22

```
1   /* simplified algorithm for execute sequential direct means */
2   Build data structures 3   /* walk list of target collections */
4   For each coll in list of one-coll-cmd-exe structures
5      - change working directory to desired execution directory 6   /* execute direct commands on each target collection */
7      - for each command in list of cmd-exe-status structures
8          - execute the command using a subordinate helper module
9          - record command status and errors
10         - if command status = FAILS continue with next collection
11     - continue with next command in list of commands 12  /* clean up and return status */
13  Change working directory back to original invocation directory
14  Return overall execution status to caller
```

FIG. 23

```
1   /* command and status info for 1 command */
2   cmd-exe-status {

3     + command to execute
4     + return code status of execution attempt
5     + other error information
6     + ...

```
1   /* N commands and status info for 1 target collection */
2   one-coll-cmd-exe {

3     + target collection for commands
4     + list of cmd-exe-status structures
5     + ...

```
1   /* commands and status info for all target collections */
2   all-coll-cmd-exe {

3     + list of coll-cmd-exe structures
4     + execution-type = DIRECT, INDIRECT
5     + exe-direct-method = FORK, THREAD, ...
6     + exe-indirect-method = BATCH, PERL, ...

```
1   if not ()==(%1) goto goodargs
2   echo Usage:    doinseq command1 c2 c3 ... c5
3   echo           doinseq  make all
4   echo           doinseq  dir *.c
5   goto quit 6   :goodargs 7   cd c:\collections\c-myphotos\win98.plt
8   call %1 %2 %3 %4 %5 %6 %7 %8 %9
9   cd c:\collections 10  cd c:\collections\parts\c-library-one\win98.plt
11  call %1 %2 %3 %4 %5 %6 %7 %8 %9
12  cd c:\collections 13  cd c:\collections\programs\helloworld\c-hello\win98.plt
14  call %1 %2 %3 %4 %5 %6 %7 %8 %9
15  cd c:\collections
16  ...
17  :quit
```

FIG. 27

```
1   C:\> cca doinseq -explicit-colls colls-fig-20.txt -platform win98.plt

2   C:\> doinseq <a-command-to-execute>
3   C:\> doinseq ls
4   C:\> doinseq make all
```

FIG. 28

1 /* simplified algorithm for execute sequential indirect */

2 Build data structures
3 Generate a batch file template framework to hold commands 4 /* walk list of collections and generate commands into the batch file */
5 For each coll in list of coll-cmd-exe structures 6   - emit command to change working directory into desired execution directory
7   - emit script file argument variables to hold commands that are passed in to the script file for execution
8   - emit command to change back to original working directory
9   - continue with next collection in list of collections 10 Return batch file execution status

FIG. 29

```
1   /* rec-coll recognized-collections data structure */

2   rec-coll {
3       + rec-coll-list

4           + coll-structure-1
5               + cspec_info ...
6               + ctype_def_info ...
7               + ccontent_info ...
8               + other_coll_info 9           + coll-structure-2
10              + cspec_info ...
11              + ctype_def_info ...
12              + ccontent_info ...
13              + other_coll_info 14          + coll-structure-3
15              ...

16      + other collection recognition info
17  }
```

FIG. 30

| | | |
|---|---|---|
| 1 | c:\collections | |
| 2 |   programs | |
| 3 |     helloworld | |
| 4 |       c-hello | ctype = cf-program<br>default vo=100 |
| 5 |       c-hello-library | ctype = cf-library<br>default vo=50 |
| 6 |       c-myprogram | ctype = cf-program<br>default vo=100 |
| 7 |   parts | |
| 8 |     c-include-files | ctype = cf-includes<br>default vo=10 |
| 9 |     c-library-one | ctype = cf-library<br>default vo=10 |
| 10 |     c-library-two | ctype = cf-library<br><u>EXPLICIT vo=49</u> |
| 11 |   webstuff | |
| 12 |     c-myhomepage | ctype = cf-doc-html<br>default vo=100 |
| 13 |     c-myphotos | ctype = cf-web-page<br>default vo=100 |

FIG. 31

| | Collection Type Name | Visit Order Ranking |
|---|---|---|
| 1 | cf-initial | 10 |
| 2 | cf-library | 50 |
| 3 | cf-program | 100 |
| 4 | cf-web-page | 100 |
| 5 | cf-doc-sgml | 100 |
| 6 | cf-doc-html | 100 |

FIG. 32

| | | |
|---|---|---|
| 1 | collection | c-library-two |
| 2 | coll_type | cf-library |
| 3 | coll_desc | A library with explicit visit order |
| 4 | coll-visit-order | 49 |
| 5 | end-collection | |

FIG. 33

| | | |
|---|---|---|
| 1 | c-hello | 100 |
| 2 | c-hello-library | 50 |
| 3 | c-myprogram | 100 |
| 4 | c-library-one | 50 |
| 5 | c-library-two | 49 |
| 6 | c-include-files | 10 |
| 7 | c-myhomepage | 100 |
| 8 | c-myphotos | 100 |

FIG. 34

1  /* simplified visit order algorithm */
2  Receive unsorted list of collections 3  Obtain numeric visit order values for each collection in list
4  Sort the list of collections according to execution visit order 5  Write sorted information to sorted-colls data structure (FIG 17)
6  Return sorted-colls data structure to calling module

FIG. 35

| 1 | c-include-files | 10 |
| 2 | c-library-two | 49 |
| 3 | c-library-one | 50 |
| 4 | c-hello-library | 50 |
| 5 | c-hello | 100 |
| 6 | c-myphotos | 100 |
| 7 | c-myhomepage | 100 |
| 8 | c-myprogram | 100 |

FIG. 36

```
1   if not ()==(%1) goto goodargs
2   echo Usage:    doinseq   command1 c2 c3 ... c5
3   echo                    doinseq   make all
4   echo                    doinseq   dir *.c
5   goto quit 6   :goodargs 7   cd c:\collections\parts\c-include-files\win98.plt    (vo=10)
8   call %1 %2 %3 %4 %5 %6 %7 %8 %9
9   cd c:\collections 10  cd c:\collections\parts\c-library-two\win98.plt      (vo=49)
11  call %1 %2 %3 %4 %5 %6 %7 %8 %9
12  cd c:\collections 13  cd c:\collections\parts\c-library-one\win98.plt      (vo=50)
14  call %1 %2 %3 %4 %5 %6 %7 %8 %9
15  cd c:\collections 16  cd c:\collections\programs\helloworld\c-hello-library\win98.plt
17  call %1 %2 %3 %4 %5 %6 %7 %8 %9               (vo-50)
18  cd c:\collections 19  cd c:\collections\programs\helloworld\c-hello\win98.plt
20  call %1 %2 %3 %4 %5 %6 %7 %8 %9               (vo=100)
21  cd c:\collections
22  ...

23  :quit
```

FIG. 37

| | Visit Order Set Name | Visit Order Definition File |
|---|---|---|
| 1 | vo-software | vo-software.def |
| 2 | vo-doc | vo-doc.def |
| 3 | vo-xxx-name | vo-xxx-name.def |

FIG. 38

| | | |
|---|---|---|
| 0 | vo-software.def: | |
| 1 | cf-initial | 10 |
| 2 | cf-library | 50 |
| 3 | cf-program | 100 |
| 4 | cf-web-page | 100 |
| 5 | cf-doc-sgml | 100 |
| 6 | cf-doc-html | 100 |

FIG. 39

| | | |
|---|---|---|
| 0 | vo-doc.def: | |
| 1 | cf-doc-sgml | 10 |
| 2 | cf-doc-html | 10 |
| 3 | cf-doc-indexes | 20 |

FIG. 40

| | | |
|---|---|---|
| 1 | collection | c-program-doc |
| 2 | coll_type | cf-doc-sgml |
| 3 | coll_desc | A doc with multiple explict visit orders |
| 4 | coll-visit-order | vo-software 49 |
| 5 | coll-visit-order | vo-doc 10 |
| 5 | end-collection | |

FIG. 41

```
1   /* simplified algorithm for calculating parallel execution groups */
2   Obtain list of target collections, sorted into proper visit order
3   Obtain physical parallelism limit = phys_par_limit
4   Obtain administrative parallelism limit = admin_limit 5   /* calculate problem parallelism limit */
6   set problem_par_limit = 1
7   For each unique visit order in list of target collections,
8     - count number of collections with current visit order value
9     - if current_count > problem_par_limit,
10        set problem_par_limit = current_count 11  /* calc min of problem, physical, and admin parallelism limits */
12  useful_par_limit = min (problem_par_limit, physical_par_limit,
                                 admin_par_limit)

13  /* calc parallel execution groups using useful_par_limit */
14  For each unique visit order in list of target collections,
15    - create a new parallel execution group
16       containing all collections that match the current visit order
17    - if group size is > useful_par_limit,
18       split group into smaller groups
19       until no groups exceed useful_par_limit
20    - continue with next unique visit order in list of target collections 21  Return parallel execution ordering and limits to caller
```

FIG. 43

```
1   /* simplified algorithm for execute parallel direct */
2   Build data structures 3   /* calculate parallel execution groups */
4   Calculate parallel execution groups per algorithm FIG 42

5   /* execute collections in each parallel group in parallel */
6   For each parallel execution group, in proper parallel exe order {
7     - Execute in parallel {
8       - For each collection in the parallel exe group
9         - change working directory to desired execution directory 10  /* execute commands for one collection */
11        - for each command in list of cmd-exe-status structures
12          - execute the command
13          - record command status and errors
14          - if command status = FAILS continue with next collection
15          - continue with next command in list of commands 16     - Wait for all collections in the group to finish
17     } /* end of parallel section beginning on Line 7
18  } /* end of parallel execution group list traversal beginning on Line 6

19  Return overall execution status information to caller
```

FIG. 44

```
1   /* collections for 1 parallel execution group */
2   parallel-exe-group {
3       + par-exe-rank = 1, 2, 3, ...
4       + par-exe-group-coll-list {
5           + collection-1
6           + collection-2
7           + ...
8   }
```

FIG. 45

```
1   /* collections for all parallel execution groups */
2   cmd-exe-parallel {

3     + list of coll-cmd-exe structures
4     + list of parallel-exe-group structures
5     + exe-type = DIRECT, INDIRECT
6     + exe-method-direct = FORK, THREAD, ...
7     + exe-method-indirect = PERL, PROGRAM,

| | | |
|---|---|---|
| 1 | time=0, vo=10 | c-include-files |
| 2 | time=1, vo=49 | c-library-two |
| 3 | time=2, vo=50 | c-library-one |
| 4 | | c-hello-library |
| 5 | time=3, vo=100 | c-hello |
| 6 | | c-myprogram |
| 7 | | c-myhomepage |
| 8 | | c-myphotos |

FIG. 47

1  /* simplified algorithm for execute parallel indirect */

2  Build data structures

3  /* calculate parallel execution groups */
4  Calculate parallel execution groups per algorithm FIG 42

5  /* execute collections in each parallel group in parallel */
6  For each parallel execution group, in proper parallel exe order {
7   - Emit commands for executing in parallel {
8     - For each collection in the parallel exe group
9       - emit cd command to change to desired execution directory 10  /* emit execution commands for one collection */
11       - for each command in list of cmd-exe-status structures
12         - emit syntax for the command to be executed in parallel
13         - emit syntax to record command status and errors
14         - continue with next command in list of commands 15   - Emit syntax to wait for all collections in the group to finish
16   } /* end of parallel section beginning on Line 7
17  } /* end of parallel execution group list traversal beginning on Line 6

18  Return overall execution status information to caller

FIG. 48

```
1   #!/bin/sh
2   if [ $# -lt 1 ] ; then
3       echo "Usage:  doinparallel command-1 c-2 c-3 ... c-N"
4       echo "        doinparallel copy file1 file2"
5       echo "        doinparallel make all"
6       exit 1
7   fi 8   # at time 0, apply parallel execution group #1
9   cd /collections/parts/c-include-files/linux.plt
10  $@
11  cd /collections 12  ...   # execution group #2 omitted to save space 13  # at time 2, apply commands parallel execution group #3
14  cd /collections/parts/c-library-one/linux.plt
15  $@ &
16  cd /collections/programs/helloworld/c-hello-library/linux.plt
17  $@ &
18  # wait for all parallel jobs to complete
19  wait
20  cd /collections 21  # at time 3, apply commands to parallel execution group #4
22  cd /collections/programs/helloworld/c-hello/linux.plt
23  $@ &
24  cd /collections/c-myprogram/linux.plt
25  $@ &
26  cd /collections/webstuff/c-myhomepage/linux.plt
27  $@ &
28  cd /collections/c-myphotos/linux.plt
29  $@ &
30  # wait for all parallel jobs to complete
31  wait
32  cd /collections 33  exit 0
```

FIG. 49

```
1    c:\collections
2        programs
3            helloworld
4                c-hello
5                    cspec
6                    s...
7                    win98.plt...
8                    gnulinux.plt...

9                c-myprogram
10                   cspec
11                   s...
12                   win98.plt...
13                   gnulinux.plt...

14           parts
15               c-include-files
16                   cspec
17                   s...
18                   win98.plt...
19                   gnulinux.plt...
```

FIG. 50

1  Visit all s dirs beside cspec files, non-recursively
2  Visit all immediate child dirs, recursively
3  Format files in all s dirs   (visit s dirs)
4  Modify all cspec files       (visit root dirs of collections)
5  Delete all collections       (visit parent dirs of collections)
6  Clean up win98.plt dirs      (visit win98.plt dirs)
7  Delete all plt dirs          (visit root dirs of collections)

COLLECTION COMMAND APPLICATOR

CROSS REFERENCES TO RELATED APPLICATIONS

This application is a continuation of U.S. patent application Ser. No. 09/885,081, now U.S. Pat. No. 6,917,947, entitled "COLLECTION COMMAND APPLICATOR," filed Jun. 21, 2001 which is incorporated herein by reference for all purposes.

This application is related to U.S. patent application Ser. No. 09/885,078, entitled "COLLECTION INFORMATION MANAGER," filed Jun. 21, 2001, which is incorporated herein by reference in its entirety.

This application is related to U.S. patent application Ser. No. 09/885,080, now U.S. Pat. No. 6,768,989 entitled "COLLECTION RECOGNIZER," filed Jun. 21, 2001, which is incorporated herein by reference in its entirety.

FIELD OF THE INVENTION

This invention relates to automated software systems for processing collections of computer files in arbitrary ways, thereby improving the productivity of software developers, web media developers, and other humans and computer systems that work with collections of computer files.

BACKGROUND OF THE INVENTION

The general problem addressed by this invention is the low productivity of human knowledge workers who use labor-intensive manual processes to work with collections of computer files. One promising solution strategy for this software productivity problem is to build automated systems to replace manual human effort.

Unfortunately, replacing arbitrary manual processes performed on arbitrary computer files with automated systems is a difficult thing to do. Many challenging subproblems must be solved before competent automated systems can be constructed. As a consequence, the general software productivity problem has not been solved yet, despite large industry investments of time and money over several decades.

The present invention provides one piece of the overall functionality required to implement automated systems for processing collections of computer files. In particular, the current invention has a practical application in the technological arts because it provides both humans and automated systems with a convenient, precise, scalable, and fully automated means for applying computer commands to collections of computer files.

Problems to be Solved

The Collection Command Applicator problem is one important problem that must be solved to enable the construction of automated collection processing systems. It is the problem of how to efficiently apply computer commands to large numbers of selected collections, in accordance with processing interdependencies that may exist among the collections.

Interesting characteristics of the collection command applicator problem include at least these: an arbitrary number of arbitrary collections in arbitrary filesystem locations may be involved; collections can have arbitrary per-instance data, size, content, data type, and internal structure; only a few interesting collections might require selection from a large pool of collections; collection recognition criteria may be based on complex combinations of collection type, collection per-instance data, collection content or external filesystem attributes; arbitrary processing commands can be applied; selected collections must be processed in proper dependency order; and parallel command execution may be required for performance reasons.

Solving the collection command applicator problem is useful because a good solution would deliver a clear N-fold productivity increase for the collection command application problem domain. Specifically, a good solution would enable human workers to issue 1 computer command to process N collections. In contrast, at least N low-level commands, one per collection, are theoretically required, and in current practice more than 2N commands are often required. Typically, current practices also generate additional costs for various adhoc scripts that are manually constructed to manage current command application processes.

The Collection Visit Order Problem is another important problem to solve. It is the problem of how to determine and enforce a valid execution visit ordering when applying commands to collections that have processing interdependencies among themselves.

Some interesting aspects of the collection visit order problem include: arbitrary numbers of arbitrary collections may be involved in an execution visit ordering calculation; numeric visit order rankings are awkward to work with when large numbers of collections are involved; visit order rankings can change frequently; visit order default rankings must sometimes be overridden for particular collection instances; and visit orders can change depending upon the specific commands that are being applied.

The Parallel Collection Command Execution Problem is another important problem to solve. It is the problem of how to optimally harness available parallel processing power during command application, while still maintaining proper execution visit order among collections.

Some interesting aspects of the parallel collection command execution problem include these: there is an inherent limit to the amount of parallelism that can be achieved within each set of collections to be processed; there is a physical limit to the amount of parallel processing power available in each computational environment; and there is a policy limit to the amount of parallelism that can be used by command applicators in each administrative environment. Ideally, the inherent parallelism limit should be less than the physical parallelism limit, and the physical parallelism limit should be less than the administrative parallelism limit.

The Nearby Execution Directory Problem is another important problem to solve. It is the problem of how to execute commands in particular nearby execution directories that are located around collections, both inside and outside of collections.

Some interesting aspects of the nearby execution directory problem include: some commands must be executed inside collections; some commands outside collections; some commands in specific parent or child directories; some commands in all immediate child directories; some commands in all peer directories; and some commands must even be executed in all instances of a particular directory within a subtree, without the benefit of using collections as a starting anchors or reference points for directory calculations.

General Shortcomings of the Prior Art

A professional prior art search for the present invention was performed, but produced no meaningful, relevant works of prior art. Therefore the following discussion is general in nature, and highlights the significant conceptual differences between file-oriented mechanisms in the prior art and the novel collection-oriented mechanisms represented by the present invention.

Prior art approaches lack support for collections. This is the largest limitation of all because it prevents the use of high-level collection abstractions that can significantly improve productivity.

Prior art approaches lack collection recognition means that use collection content, collection data type, and collection per-instance data in collection recognition activities.

Prior art approaches lack execution visit ordering means to control the order in which commands are applied to particular collections within a set of collections, thereby ensuring the orderly processing of interdependencies among processed collections.

Prior art approaches lack parallel execution means for optimally processing collections in parallel, especially when execution visit ordering must be maintained within a parallel execution environment.

Prior art approaches lack indirect command execution means such as script files, thereby preventing the creation and use of persistent, reusable visit orderings and parallel execution orderings for processing collections.

As can be seen from the above description, prior art mechanisms in general have several important disadvantages. Notably, general prior art mechanisms do not support collections, and do not support visit ordering. These are the two most important limitations of all.

In contrast, the present invention has none of these limitations, as the following disclosure will show.

SUMMARY OF THE INVENTION

A collection command applicator program applies arbitrary computer commands to large numbers of dynamically selected collections, using proper execution dependency ordering and parallel execution methods. A collection command applicator can thus significantly improve the productivity of human knowledge workers in the information industry.

In operation, a collection command applicator dynamically recognizes and selects interesting collections, calculates an optimal execution dependency visit order among collections, calculates an optimal parallel execution order for commands, and then applies arbitrary computer commands to the recognized collections in accordance with the calculated orderings. In addition, a collection command applicator can generate reusable script files to store command application calculations in persistent form.

Thus the present collection command applicator invention enables both human workers and software programs to easily process large numbers of collections in automated, scalable ways that were not previously possible.

Objects and Advantages

The present collection command applicator invention solves all of the general prior art limitations described previously. Specifically, it supports collections, collection recognition means, visit order means, parallel command execution means, and indirect command execution means including script files.

The main object of collection command applicator systems is to efficiently apply arbitrary computer commands to large numbers of dynamically recognized collections, using proper visit orders and parallel command execution means, thereby providing a solution to the general collection command application problem.

Another object is to provide a generalized, scalable, and automated collection command applicator means, thereby enabling the construction of generalized, scalable, automated collection processing systems.

Another object is to use a collection recognizer means capable of selecting collections using selection criteria based on collection content, collection data type, and collection instance data, thereby allowing commands to be applied to precisely-selected, particular sets of collections within large pools of collections.

Another object is to provide a collection command applicator that is capable of directly executing commands, in either sequential or parallel order, thereby enabling immediate application of commands to collections during a single program invocation.

Another object is to provide indirect execution of commands by generating script files, thereby creating a reusable and persistent way of applying commands to sets of collections.

Another object is to determine and use a proper execution visit order during command application, thereby ensuring that commands are applied in order according to interdependencies that may exist among processed collections, and thereby providing a solution to the collection visit order problem.

Another object is to determine and use an optimal parallel execution order during command application, thereby using parallel processing power to optimally process collections in a minimum amount of time, and thereby providing a solution to the parallel collection command execution problem.

Another object is to provide command application in nearby execution directories that are located in and around collections that are being processed, thereby enabling commands to be conveniently applied in frequently used nearby collection directories without requiring special efforts from human knowledge workers.

As can be seen from the objects above, collection command applicator systems provide a general, scalable, and automated means of applying arbitrary commands to arbitrary sets of precisely selected collections. Collection command applicator programs thus enable both humans and programs to conveniently apply arbitrary computer commands to arbitrary sets of collections in scalable, automated ways that were not previously possible.

Further advantages of the present invention will become apparent from the drawings and disclosure below.

BRIEF DESCRIPTION OF DRAWINGS

FIG. 1 shows a sample prior art filesystem folder in a typical personal computer filesystem.

FIG. 2 shows how a portion of the prior art folder in FIG. 1 has been converted into a collection 100 by the addition of a collection specifier file 102 named "cspec" FIG. 2 Line 5.

FIG. 3 shows an example physical representation of a collection specifier 102, implemented as a simple text file such as would be used on a typical personal computer filesystem.

FIG. 4 shows four major information groupings for collections, including collection type definition 101, collection specifier 102, collection content 103, and collection 100.

FIG. 5 shows a more detailed view of the information groupings in FIG. 4, illustrating several particular kinds of per-collection-instance and per-collection-type information.

FIG. 8 shows an example software collection datastructure that relates collection specifier and collection content information for a single collection instance.

FIG. 9 shows an example collection type definition datastructure, such as might be used by software programs that process collections.

FIG. 10 shows a more detailed example of the kinds of information found in collection type definitions.

FIG. 11 shows a simplified architecture for a CCA program.

FIG. 12 shows a simplified algorithm for a CCA program.

FIG. 13 shows an example data structure for holding runtime information used by a CCA program.

FIG. 15 shows a simplified algorithm for a collection list producing means 140.

FIG. 16 shows an example data structure for holding a list of target collections for command application.

FIG. 17 shows an example data structure for holding sorted lists of target collections for command application.

FIG. 18 shows an example data structure for holding information used by a collection list producing means 140.

FIG. 19 shows a tree of collections used for illustration purposes.

FIG. 20 shows the contents of a text file containing explicit filesystem pathnames to each of the collections shown in the tree of FIG. 19, to be used as input to a CCA program.

FIG. 22 shows a simplified algorithm for an Command Execute Sequential Direct Means 170.

FIG. 23 shows an example data structure for managing command execution and status information for one applied command.

FIG. 24 shows an example data structure for managing all command execution and status information for one target collection.

FIG. 25 shows an example data structure for managing all command execution and status information for all target collections.

FIG. 26 shows an example output script file created by a Generate Sequential Script File module 181 that is part of a Command Execute Sequential Indirect Means 180.

FIG. 27 shows an example command sequence for creating and executing the script file of FIG. 26.

FIG. 28 shows a simplified algorithm for a Command Execute Sequential Indirect Means 180, using a Generate Sequential Script File module 181 to generate a script file.

FIG. 29 shows an example data structure for representing a list of target collections for command application, produced by a Collection Recognizer Means 143.

FIG. 30 shows the example collection tree of FIG. 19, augmented with collection type and visit order data.

FIG. 31 shows an example visit order table for associating collection types with execution visit orders.

FIG. 32 shows an example collection specifier file similar to the one shown in FIG. 3, but augmented with an explicit visit order value.

FIG. 33 shows an example unsorted visit order sequence for the collection tree of FIG. 30.

FIG. 34 shows a simplified algorithm for a Sort Collection List Visit Order Means 152.

FIG. 35 shows an example sorted visit order sequence for the collection tree of FIG. 30.

FIG. 36 shows an example script file created by a Generate Sequential Script File module 181, this time visiting collections in proper execution visit order.

FIG. 37 shows an example visit order set name table that associates named visit order sets with definition files that provide numeric visit order rankings.

FIG. 38 shows an example named visit order set definition file for software builds.

FIG. 39 shows an example named visit order set definition file for documentation builds.

FIG. 40 shows an example collection specifier file containing multiple explicit named visit order values.

FIG. 41 shows a simplified algorithm for a Calculate Parallel Execution Groups means FIG. 42 201.

FIG. 43 shows a simplified algorithm for a Command Execute Parallel Direct Means FIG. 42 200.

FIG. 44 shows an example data structure for managing the parallel application of one command to multiple target collections within one parallel execution group.

FIG. 45 shows an example data structure for managing the parallel application of one command to multiple target collections, for all parallel execution groups.

FIG. 46 shows an example parallel execution ordering for all collections in the tree of FIG. 30.

FIG. 47 shows a simplified algorithm for a Command Execute Parallel Indirect Means 210.

FIG. 48 shows an example script file created by a Generate Parallel Script File module 212, using the parallel execution ordering of FIG. 46.

FIG. 49 shows an expanded version of the collection tree of FIG. 19, augmented with two platform directories to illustrate an application of nearby execution directories.

FIG. 50 shows a table containing possible applications where nearby execution directories would be useful.

LIST OF DRAWING REFERENCE NUMBERS

Figure 6:
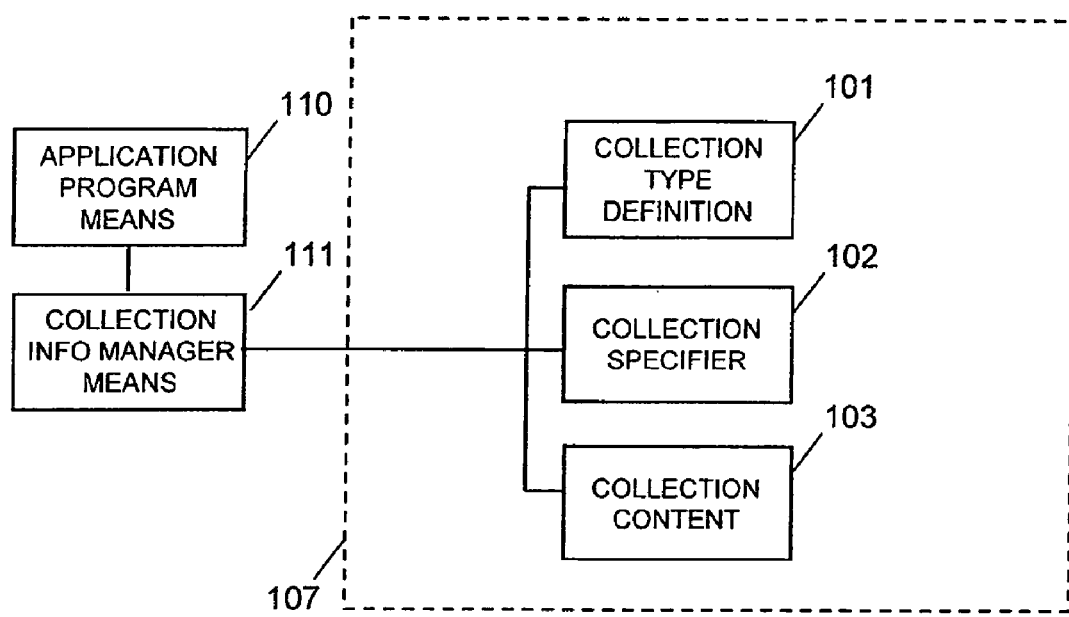
FIG. 6 shows a logical diagram of how a Collection Information Manager Means 111 would act as an interface between an application program means 110 and a collection information means 107, including collection information sources 101-103.

100 A collection formed from a prior art folder
101 Collection type definition information
102 Collection specifier information
103 Collection content information
104 Per-collection collection processing information
105 Per-collection collection type indicator
106 Per-collection content link specifiers
110 Application program means
111 Collection information manager means
112 Collection type definition API means
113 Collection specifier API means
114 Collection content API means
115 Collection type definition server means
116 Collection specifier server means
117 Collection content server means
120 CCA manager module
121 Get Runtime Information module
140 Collection list producing means
141 Get collection list module 142 Get collection list explicit module
143 Collection recognizer means
144 Get collection list other module
150 Sort collection list module
151 Sort collection list alphabetic
152 Sort collection list visit order module
153 Sort collection list other module
160 Command execute means
161 Command execute sequential means
162 Command execute parallel means
170 Command execute sequential direct means
171 Execute fork means
172 Execute thread means
173 Execute sequential direct other means
180 Command execute sequential indirect means
181 Generate sequential script file
182 Generate sequential program file
183 Execute sequential indirect other means
200 Command execute parallel direct means
201 Calculate parallel execution groups
202 Execute parallel fork means
203 Execute parallel thread means
204 Execute parallel direct other means
210 Command execute parallel indirect means
212 Generate parallel script file
213 Generate parallel program file
214 Execute parallel indirect other means

DETAILED DESCRIPTION

Overview of Collections

This section introduces collections and some related terminology.

Collections are sets of computer files that can be manipulated as a set, rather than as individual files. Collection information is comprised of three major parts: (1) a collection specifier that contains information about a collection instance, (2) a collection type definition that contains information about how to process all collections of a particular type, and (3) optional collection content in the form of arbitrary computer files that belong to a collection.

Collection specifiers contain information about a collection instance. For example, collection specifiers may define such things as the collection type, a text summary description of the collection, collection content members, derivable output products, collection processing information such as process parallelism limits, special collection processing steps, and program option overrides for programs that manipulate collections. Collection specifiers are typically implemented as simple key-value pairs in text files or database tables.

Collection type definitions are user-defined sets of attributes that can be shared among multiple collections. In practice, collection specifiers contain collection type indicators that reference detailed collection type definitions that are externally stored and shared among all collections of a particular type. Collection type definitions typically define such things as collection types, product types, file types, action types, administrative policy preferences, and other information that is useful to application programs for understanding and processing collections.

Collection content is the set of all files and directories that are members of the collection. By convention, all files and directories recursively located within an identified set of subtrees are usually considered to be collection members. In addition, collection specifiers can contain collection content directives that add further files to the collection membership. Collection content is also called collection membership.

Collection is a term that refers to the union of a collection specifier and a set of collection content.

Collection information is a term that refers to the union of collection specifier information, collection type definition information, and collection content information.

Collection membership information describes collection content.

Collection information managers are software modules that obtain and organize collection information from collection information stores into information-rich collection data structures that are used by application programs.

Collection Physical Representations—Main Embodiment

FIGS. 1-3 show the physical form of a simple collection, as would be seen on a personal computer filesystem.

FIG. 1 shows an example prior art filesystem folder from a typical personal computer filesystem. The files and directories shown in this drawing do not implement a collection 100, because no collection specifier 102, FIG. 2 Line 5 exists to associate a collection type definition FIG. 4 101 with collection content information FIG. 4 103.

FIG. 2 shows the prior art folder of FIG. 1, but with a portion of the folder converted into a collection 100 by the addition of a collection specifier file FIG. 2 Line 5 named "cspec". In this example, the collection contents FIG. 4 103 of collection 100 are defined by two implicit policies of a preferred implementation.

First is a policy to specify that the root directory of a collection is a directory that contains a collection specifier file. In this example, the root directory of a collection 100 is a directory named "c-myhomepage" FIG. 2 Line 4, which in turn contains a collection specifier file 102 named "cspec" FIG. 2 Line 5.

Second is a policy to specify that all files and directories in and below the root directory of a collection are part of the collection content. Therefore directory "s" FIG. 2 Line 6, file "homepage.html" FIG. 2 Line 7, and file "myphoto.jpg" FIG. 2 Line 8 are part of collection content FIG. 4 103 for said collection 100.

FIG. 3 shows an example physical representation of a collection specifier file 102, FIG. 2 Line 5, such as would be used on a typical personal computer filesystem.

Collection Information Types p FIGS. 4-5 show three kinds of information that comprise collection information.

FIG. 4 shows a high-level logical structure of three types of information that comprise collection information: collection processing information 101, collection specifier information 102, and collection content information 103. A logical collection 100 is comprised of a collection specifier 102 and collection content 103 together. This diagram best illustrates the logical collection information relationships that exist within a preferred filesystem implementation of collections.

FIG. 5 shows a more detailed logical structure of the same three types of information shown in FIG. 4. Collection type definition information FIG. 4 101 has been labeled as per-type information in FIG. 5 103 because there is only one instance of collection type information 101 per collection type. Collection content information FIG. 4 103 has been labeled as per-instance information in FIG. 5 103 because there is only one instance of collection content information per collection instance. Collection specifier information 102 has been partitioned into collection instance processing information 104, collection-type link information 105, and collection content link information 106. FIG. 5 is intended to show several important types of information 104-106 that are contained within collection specifiers 102.

Suppose that an application program means FIG. 6 110 knows (a) how to obtain collection processing information 101, (b) how to obtain collection content information 103, and (c) how to relate the two with per-collection-instance information 102. It follows that application program means FIG. 6 110 would have sufficient knowledge to use collection processing information 101 to process said collection content 103 in useful ways.

Collection specifiers 102 are useful because they enable all per-instance, non-collection-content information to be stored in one physical location. Collection content 103 is not included in collection specifiers because collection content 103 is often large and dispersed among many files.

All per-collection-instance information, including both collection specifier 102 and collection content 103, can be grouped into a single logical collection 100 for illustrative purposes.

Collection Application Architectures

Figure 7:
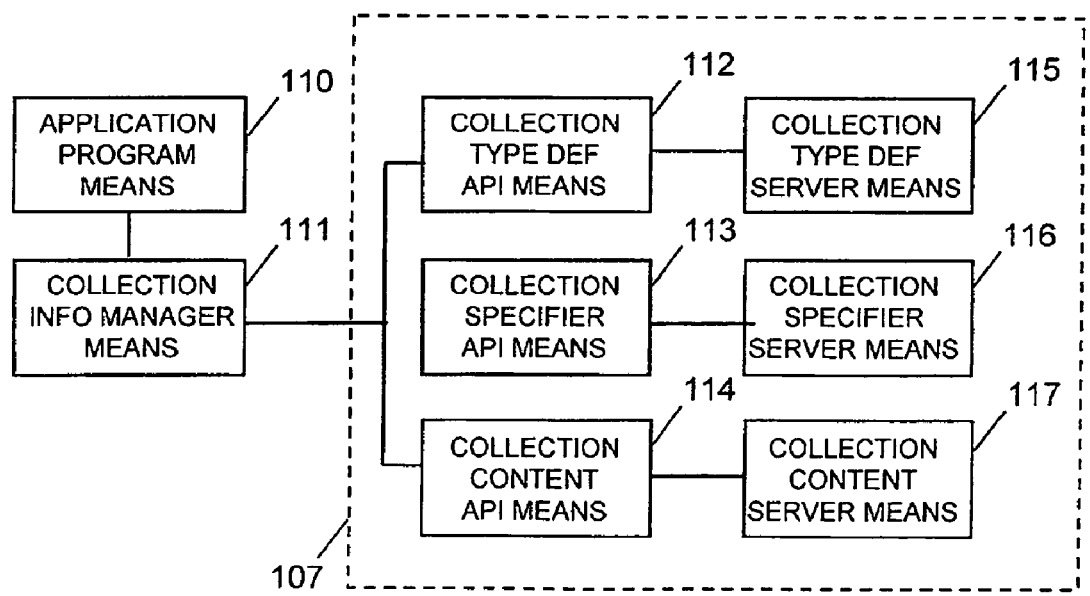
FIG. 7 shows a physical software embodiment of how an Application Program Means 110 would use a Collection Information Manager Means 111 to obtain collection information from various collection information API means 112-114 connected to various collection information server means 115-117.

FIGS. 6-7 show example collection-enabled application program architectures.

FIG. 6 shows how a collection information manager means 111 acts as an interface between an application program means 110 and collection information means 107 that includes collection information sources 101-103. Collectively, collection information sources 101-103 are called a collection information means 107. A collection information manager means 111 represents the union of all communication mechanisms used directly or indirectly by an application program means 110 to interact with collection information sources 101-103.

FIG. 7 shows a physical software embodiment of how an application program means 110 could use a collection information manager means 111 to obtain collection information from various collection information API (Application Programming Interface) means 112-114 connected to various collection information server means 115-117.

Collection type definition API means 112 provides access to collection type information available from collection type definition server means 115. Collection specifier API means 113 provides access to collection specifier information available from collection specifier server means 116. Collection content API means 114 provides access to collection content available from collection content server means 117.

API means 112-114, although shown here as separate software components for conceptual clarity, may optionally be implemented wholly or in part within a collection information manager means 111, or within said server means 115-117, without loss of functionality.

API means 112-114 may be implemented by any functional communication mechanism known to the art, including but not limited to command line program invocations, subroutine calls, interrupts, network protocols, or file passing techniques.

Server means 115-117 may be implemented by any functional server mechanism known to the art, including but not limited to database servers, local or network file servers, HTTP web servers, FTP servers, NFS servers, or servers that use other communication protocols such as TCP/IP, etc.

Server means 115-117 may use data storage means that may be implemented by any functional storage mechanism known to the art, including but not limited to magnetic or optical disk storage, digital memory such as RAM or flash memory, network storage devices, or other computer memory devices.

Collection information manager means 111, API means 112-114, and server means 115-117 may each or all optionally reside on a separate computer to form a distributed implementation. Alternatively, if a distributed implementation is not desired, all components may be implemented on the same computer.

Collection Data Structures

FIGS. 8-10 show several major collection data structures.

FIG. 8 shows an example collection datastructure that contains collection specifier and collection content information for a collection instance. Application programs could use such a datastructure to manage collection information for a collection that is being processed.

In particular, preferred implementations would use collection datastructures to manage collection information for collections being processed. The specific information content of a collection datastructure is determined by implementation policy. However, a collection specifier typically contains at least a collection type indicator FIG. 8 Line 4 to link a collection instance to a collection type definition.

FIG. 9 shows an example collection type definition datastructure that could be used by application programs to process collections. Specific information content of a collection type definition datastructure is determined by implementation policy. However, collection type definitions typically contain information such as shown in FIGS. 9-10.

FIG. 10 shows example information content for a collection type definition datastructure such as shown in FIG. 9. FIG. 10 shows information concerning internal collection directory structures, collection content location definitions, collection content datatype definitions, collection processing definitions, and collection results processing definitions. The specific information content of a collection type definition is determined by implementation policy. If desired, more complex definitions and more complex type definition information structures can be used to represent more complex collection structures, collection contents, or collection processing requirements.

Collection Command Applicator Means

FIG. 11 shows a simplified architecture for a collection command applicator (CCA) program. A CCA manager module 120 oversees the command application process.

Module Get Runtime Info 121 obtains input arguments from the invocation command line, obtains runtime option values and configuration values from the execution environment, and otherwise prepares initial data for the command application process.

Module Collection List Producing Means 140 oversees the process of obtaining a list of target collections to which commands will be applied. Several different methods of obtaining the list are described below. The obtained list typically contains the identities of target collections, filesystem locations of target collections, and other useful collection information about the target collections.

Module Command Execution Means 160 oversees the process of applying commands to the list of target collections. Module Command Execution Sequential Means 161 applies commands to collections in sequential order, such that a command application to one collection is completed before another command application to another collection begins. In contrast, Module Command Execution Parallel Means 162 applies commands to collections in parallel, such that a single command can be applied to many collections in parallel. Parallel application of commands is useful because it reduces the time required to perform an entire command application to a set of target collections.

Operation

In operation, CCA Manager 120 proceeds according to the simplified algorithm shown in FIG. 12.

First, CCA Manager 120 calls Get Runtime Info 121 to obtain runtime information and load it into a data structure "runtime-info" such as shown in FIG. 13. In particular, Get Runtime Info 121 is responsible for ensuring that commands that are to be applied FIG. 13 Line 5 are present within the data structure for later use by Command Execution Means 160.

Next, CCA Manager 120 calls Collection List Producing Means 140 to obtain a list of target collections and associated collection information for subsequent command application.

Finally, CCA Manager 120 calls Command Execution Means 160 to apply commands obtained by Get Runtime Info 121 to each collection in the list of target collections, thereby completing the command application function of the CCA program.

Now that overall program structure and operation have been described, more detailed explanations can be usefully provided below.

Collection List Producing Means

Figure 14:
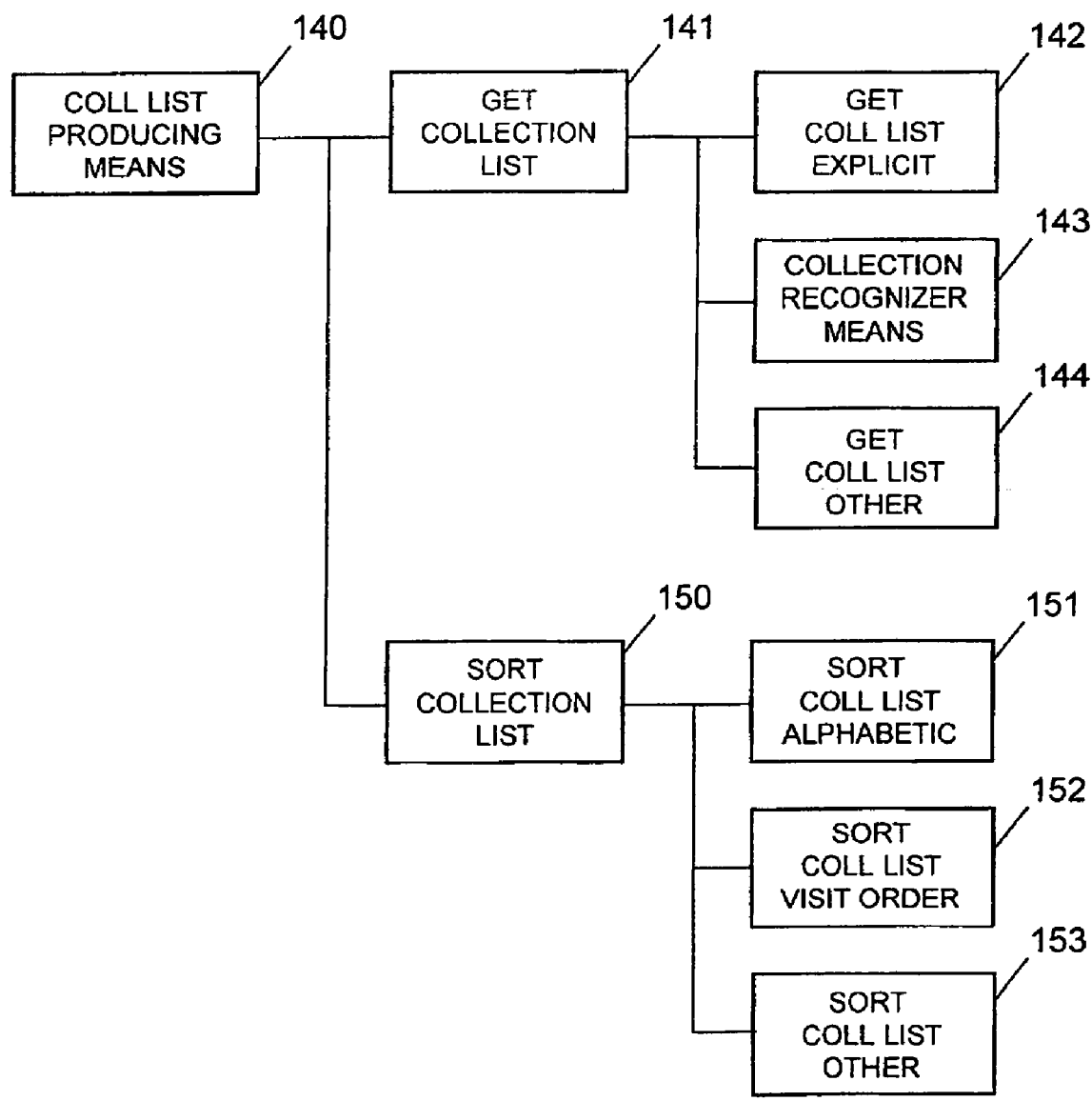
FIG. 14 shows an expanded architecture for the collection list producing means of FIG. 11.

FIG. 14 shows an expanded architecture for the Collection List Producing Means 140 shown in FIG. 11. The collection list producing mechanism performs two main functions: obtaining a list of target collections, and sorting the list of target collections.

First, Get Collection List 141 is responsible for obtaining a list of target collections for command application. Several different methods of calculating a list are possible, including the methods represented by modules 142-144.

Get Collection List Explicit 142 obtains an explicit collection list from information provided to the CCA program invocation via Get Runtime Info 121. FIG. 20 shows an example of explicit collection pathname information for the collection tree of FIG. 19.

Collection Recognizer Means 143 obtains a list of target collections by dynamically recognizing selected collections located within a collection search space, according to match criteria provided to the CCA program invocation. Collection Recognizers are disclosed in a related patent application. See the "Cross-References To Related Applications" section of this document for more information.

Get Collection List Other Means 144 architecturally represents the idea that other means of obtaining collection lists are also possible. For example, such as by calling external programs to produce collection lists, by retrieving collection lists from databases, by algorithmically calculating collection lists, and so on.

Second, Sort Collection List 150 is responsible for sorting the list of collections obtained from Get Collection List 141 into a useful sort order, if a sort is required. Note that sorts are not always desirable; unsorted collection lists are useful for many common computational purposes, and are used frequently.

Sort Collection List Alphabetical 151 orders collections on the list according to alphabetic sorting criteria, usually by collection name. In general, this method is most useful for improving the readability of output processing information.

Sort Collection List Visit Order 152 orders collections on the list according to relative execution order dependencies among the collections, for example to ensure successful software builds. This is one of the most important collection list ordering mechanisms.

Sort Collection List Other Means 153 architecturally represents the idea that other means of sorting collection lists for other purposes are also possible. For example, sorting by collection size, processing time, administrative priority, resources required, and so on. Collection lists can be sorted as needs require.

Operation

In operation, Collection List Producing Means 140 proceeds according to the simplified algorithm shown in FIG. 15. Generally speaking, Collection List Producing Means 140 calls Get Collection List 141 to obtain a list of target collections, and then calls Sort Collection List 150 to sort the list of collections.

First, the algorithm builds data structures FIG. 16-18 to support the pending computation.

To construct a list of target collections FIG. 15 Lines 3-6, Get Collection List 141 calls one or more of its subordinate modules 142-144 to obtain collection lists, in accordance with command line control arguments provided to the invocation. In a simple preferred embodiment, Get Collection Explicit 142 could be called to produce a list, and could use a simple text file FIG. 20 to explicitly list collection pathnames within a particular collection tree FIG. 19. In this simple preferred embodiment, the text file FIG. 20 could be provided as a command line argument to the CCA program invocation. Alternative means 143-144 of constructing a list are also possible, such as by using a Collection Recognizer Means 143. But since Collection Recognizer Means 143 is a more complex (but preferred) method of building a collection list, it is described later in this document as an enhanced embodiment.

The obtained collection list is stored in a data structure "target-coll-list" FIG. 16. This data structure is essentially a list of smaller individual collection data structures FIG. 8. A collection data structure FIG. 8, when fully populated, contains essentially all there is to know about a collection, with the exception that actual collection content is not stored within the data structure.

Once a list of collections has been obtained, data structure "target-coll-list" FIG. 16 is returned by Get Collection List 141 to the calling module Collection List Producing Means 140 for subsequent sorting of the collection list.

To sort the obtained list of target collections, Sort Collection List 150 calls one or more of its subordinate modules 151-153 to perform the sorting work. In one preferred embodiment, no sorting is required, so the original unordered collection list is returned unmodified. In a second preferred embodiment, simple alphabetic sorts are required, so Sort Collection List Alphabetic 151 is called. In a third preferred embodiment, execution visit order sorting is required. However, since visit order sorting performed by Sort Collection List Visit Order 152 is a more complex (but preferred) method of sorting, it is described later in this document as an enhanced embodiment.

The sorted collection list is stored in a data structure "sorted-colls" FIG. 17. This data structure holds sorting information for one possible sort of a collection list. In particular, the example data structure contains a sort type indicator FIG. 17 Line 3 and a set of sorted collections in sort order FIG. 17 Lines 4-7.

Multiple different sortings of one input collection list are possible in theory, for example if the commands to be applied require different sortings. In such a case, multiple sorted-colls structures would be required to hold multiple sortings of a collection list. Typical simple embodiments do not require multiple sorts, however.

Once sorted collection lists have been obtained, they are returned by Sort Collection List Means 150 to the calling module Collection List Producing Means 140.

Collection List Producing Means 140 further organizes all collection list production information into a data structure "coll-list-prod-info" FIG. 18. This data structure contains comprehensive information about the collection list production process and output results. In particular, the data structure FIG. 18 includes a list of target collections Line 3, a list of corresponding collection type definitions Line 4 for the target collections, a list of various sort orderings Line 5 for the target collections, a list of collection recognizer information Line 6, and other information of interest to the CCA program.

Finally, data structure "coll-list-prod-info" FIG. 18 is returned by Collection List Producing Means 140 to the calling module CCA Manager 120, for eventual use in command application.

Command Execute Sequential Means

Figure 21:
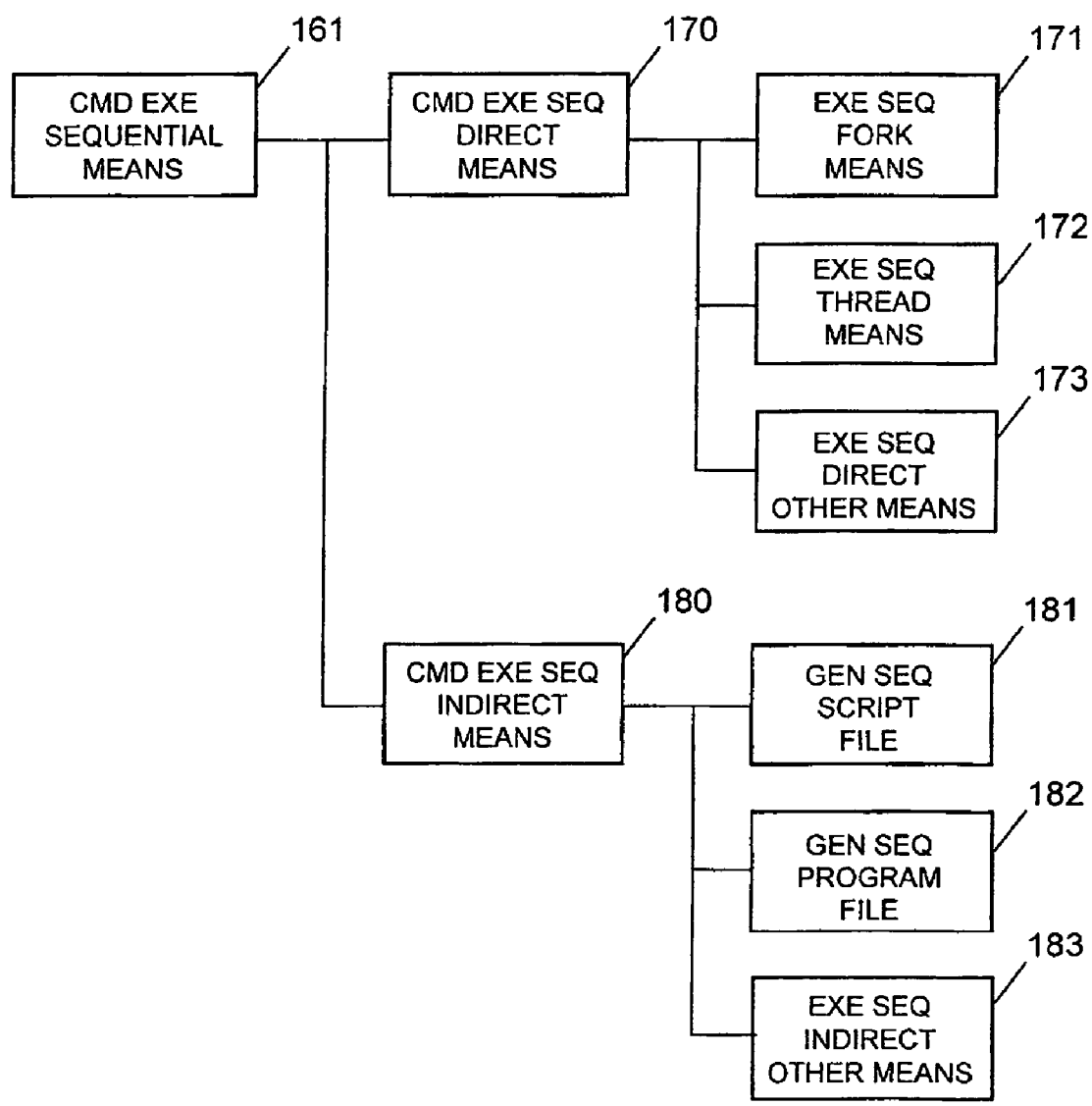
FIG. 21 shows an expanded architecture for a command execution sequential means 161.

FIG. 21 shows an expanded architecture for the Command Execute Sequential Means 161 shown in FIG. 11. Two sequential command execution approaches are possible: direct and indirect.

In direct execution mode, applied commands are executed by a CCA program in real time, such that all command applications are completed before the CCA program invocation is completed.

In contrast, an indirect command execution approach does not use real time execution. Instead, a CCA program using an indirect command execution approach generates an output script file FIG. 26 that can be reused many times to apply commands to target collections. Script files contain a specific list of all target collections identified at the time the file was created, but typically do not contain any commands to apply. Rather, script files contain internal argument placeholders for receiving commands to apply from the command line. This approach enables script files to be reused many times, each time with differing commands provided on the script invocation command line.

In practice, indirect command application is very useful because it saves the repetitive cost of recalculating the same target collection set each time a new command must be applied to a stable working set of collections. Moreover, generated script files are tangible files that can be moved, copied, stored, reused, and otherwise treated like normal files. In contrast, direct mode executions must recalculate the target set for each command application, and have no convenient tangible form to move, copy, store, or reuse.

Command Execute Sequential Direct Means

Command Execute Sequential Direct Means 170 is generally responsible for directly and sequentially executing commands on the list of target collections. Subordinate modules 171-173 perform most of the execution work involved, and represent various technical ways of spawning subprocesses to perform the required command applications.

Execute Sequential Fork Means 171 uses process "forks" to execute provided commands in child or peer computational processes. Forking techniques have been known to the art for many decades, are well-described in the literature, are taught in computer science schools, and can be seen in source code form in many freeware programs on the net.

Execute Sequential Thread Means 172 uses process "threads" to execute provided commands in peer thread processes. Threading techniques have been known to the art for well over one decade, are well-described in the literature, are taught in computer science schools, and can be seen in source code form in freeware programs on the net.

Execute Sequential Other Means 173 architecturally represents the idea that other means of sequentially executing commands are also possible and known to the art, including by remote procedure calls, by interrupt routines, by coroutines, and so on.

Operation

In operation, Command Execute Sequential Direct Means 170 proceeds according to the simplified algorithm shown in FIG. 22.

First, the algorithm builds data structures to support the computation.

FIG. 23 shows a command-oriented data structure "cmd-exe-status" for holding one command to execute and various kinds of execution status and error reporting information.

FIG. 24 shows a larger collection-oriented data structure "one-coll-cmd-exe" for holding command application information for 1 collection and N commands to be applied to that collection.

FIG. 25 shows a still larger CCA-invocation-oriented data structure "all-coll-cmd-exe" for holding command application information for N collections and N commands. This is a top-level data structure used to manage overall sequential direct command application.

As part of building the data structures, Command Execute Sequential Direct Means 170 derives a command application execution directory pathname for each target collection, and stores the directory into the datastructures listed above. The execution directory is the filesystem working directory in which commands are applied. FIG. 26 Lines 7 and 10 show examples of how the execution directory is used during indirect command execution. FIG. 22 Line 5 shows how calculated execution directories are used in direct command execution.

Typically, execution directory pathnames are derived from a collection root directory pathname FIG. 20 by appending an execution platform name to the collection root directory. Platform names are derived from operating system names, such as platform "gnulinux.plt" for the freeware GNU/Linux operating system, or "win98.plt" for the Windows 98 operating system. Specific platform names are generally determined by implementation policy.

Next, Command Execute Sequential Direct Means 170 traverses the list of target collections stored in the data structure "all-coll-cmd-exe" FIG. 25. List traversal begins at FIG. 22 Line 4.

For each collection in the list of target collections, a subordinate module FIG. 21 171-173 is called to perform a command application using a desired execution method. The particular type of execution method (fork, thread, . . . ) is specified by runtime information such as command line arguments or CCA program configuration options.

Command execution status information is collected and stored into "cmd-exe-status" FIG. 23 data structures as algorithm FIG. 22 proceeds. Implementation policies control behavior if a command application fails. That is, execution may continue to the next target collection in the list, or may be aborted for the whole CCA program invocation, as policies dictate.

Once command application is complete, data structure "all-coll-cmd-exe" FIG. 25 is returned by Command Execute Sequential Direct 170 to Command Execute Sequential Means 161 and eventually to Command Execute Means 160 and CCA Manager 120.

Command execution results are extracted from data structures and communicated to CCA users. The type and quantity of results information returned is determined by implementation policy. Typically, normal execution results are printed or displayed in real time as commands are executed, and a final program status code is returned to the operating system when the CCA program completes.

Command Execute Sequential Indirect Means

Command Execute Sequential Indirect Means 180 is generally responsible for indirectly and sequentially executing commands on the list of target collections.

Subordinate modules 181-184 perform the real work involved, and represent various technical ways of creating executable process descriptions in the form of script files or compilable programs.

Generate Sequential Script File 181 creates a reusable script file in a typical scripting language for the host operating system. The generated script file visits and applies a command to all collections in the list of target collections.

Generate Sequential Program File 182 creates source code in a typical programming language for a program that will visit, and apply a command to, all collections in the list of target collections. The main benefit offered by this approach is that programming languages enable the generation of more complex indirect command application scripts. The main disadvantage is that the program file must usually be compiled before it can be executed, possibly imposing a significant cost overhead.

Execute Sequential Indirect Other Means 183 architecturally represents the idea that other means of indirectly and sequentially executing commands are also possible and known to the art, including calling external job control systems to perform the requested jobs.

Operation

In operation, Command Execute Sequential Indirect Means 180 proceeds according to the simplified algorithm shown in FIG. 28. The algorithm builds required data structures, then traverses the list of target collections, emitting script file commands to apply provided commands to target collections in the list. All technical operations required to generate script files are simple, are well described in the literature, and are well known to the art.

FIG. 26 shows an example generated script file for a typical personal computer operating system. This script file visits collections in the collection tree of FIG. 19, as described by the explicit collection pathname list of FIG. 20.

FIG. 27 Line 1 shows how to generate the script file of FIG. 26 using a CCA program. In this example, the list of collections to visit is explicitly specified in a simple text file called "colls-fig-20.txt". The output script filename is "doinseq" (do in sequence).

FIG. 27 Line 2 shows the generic syntax required to invoke the generated script file. FIG. 27 Lines 3-4 show how to use the generated script file to perform command applications of the "ls" and "make all" commands to all target collections named in the script file.

This concludes presentation of the simplest preferred embodiments of the present collection command applicator invention, using explicit input collection lists, and direct and indirect command application methods. In what follows, several enhanced preferred embodiments will be described.

Collection Recognizer Means

One important enhanced embodiment is concerned with the problem of obtaining lists of target collections for command application. Two main ways of obtaining lists are through manual or automated means.

The manual method of using explicit collection lists FIG. 20 provided on a command line FIG. 27 Line 1 was described previously. The main advantage of this method is that it can be used to specify target collection sets that are difficult or impossible to automatically calculate.

However, the automated method of using a Collection Recognizer Means FIG. 14 143 to dynamically identify target collections is preferable in most cases.

The main function of collection recognizers is to identify interesting collections within a search space using collection matching criteria. Dynamic matching enables programs to dynamically form large lists of interesting collections by simply by specifying search space and collection selection criteria.

Collection command applicator programs that use collection recognizers become very powerful, useful tools. Specifically, collection recognizers can dynamically create large lists of target collections, and CCA programs can apply arbitrary commands to the target collections. This combination provides humans with a very convenient, efficient, and scalable means of automatically applying commands to large sets of automatically-identified collections.

Collection Recognizers are disclosed in a related patent application. See the "Cross-References To Related Applications" section of this document for more information. Only a summary discussion is provided below.

Collection recognizers search for collections within collection search spaces. In preferred filesystem embodiments, collection search spaces are subtrees within typical hierarchical filesystems.

In particular, one important collection search space is the subtree below the current working directory. The main advantage of using this subtree as a search space is that it is a natural hierarchical place for human users to work from when working with multiple collections. For example, the "collections" directory in FIG. 19 Line 1 is a directory in the filesystem that contains all the collections within the tree. It follows that if all collections within the tree of FIG. 19 were of interest, the "collections" directory would be a natural place from which to start searching downward for collections.

Operation

In the context of supporting collection command application operations, a collection recognizer begins by receiving search space and collection match criteria from its calling program.

Search space criteria are provided to the collection recognizer invocation by the calling CCA program. The most common search space is usually the subtree rooted at the current working directory, but other search space directories may also be provided as explicit pathnames to the recognizer invocation.

Collection match criteria are also provided to the collection recognizer invocation by the calling CCA program. The most common collection match criteria specify that all collections are interesting, thereby enabling the calling program to process all collections within the search space subtree.

Once search space and match criteria have been obtained, collection recognizers search downward through the search space for matching collections. Two major functions are performed during downward tree searches: collection detection and collection selection.

Downward tree searches are typically implemented using tree traversal algorithms well-known to the art, including depth first and breadth first searches. In practice there is no significant performance difference between depth-first and breadth-first for small sets of small collections. For large sets of collections organized into shallow trees, breadth-first searches would probably offer higher performance because collection root directories would be discovered sooner.

Collection detection proceeds by examining each directory in the search space for the presence of a collection. Collections are detected by their collection signatures, which are sets of filesystem attributes that mark the existence of a collection. Various types and combinations of filesystem attributes for defining collection signatures are possible, including the use of specific file and directory names, suffixes, owners, timestamps, or other such filesystem information. The particular structure of collection signatures is defined by implementation policy.

Collection selection proceeds by comparing each detected collection with provided selection criteria. Selection criteria can be complex, and may be based on collection instance data (within the collection specifier), collection type data (within the collection type definition), or collection content information (within files that belong to the collection). Typical collection selections are based on collection specifier information. More complex searches are possible, and would use collection type information or collection content information. The combined process of detection and selection is called collection recognition.

Information obtained from a recognition process is stored into a "rec-coll" data structure FIG. 29 as recognition proceeds. The main element of the recognized collections data structure is a list of recognized collections FIG. 29 Line 3, heavily augmented with additional information FIG. 29 Lines 5-8 about each collection in the list.

Once recognition has completed, a recognized collections data structure FIG. 29 representing the search is returned by Collection Recognizer Means 143 to Get Collection List 141, and eventually to Collection List Producing Means 140 and CCA Manager 120, for subsequent use in command application.

Collection Recognizers play a very important, very practical role in enabling the construction of scalable, automated command application systems.

Collection Visit Ordering Means

A second important enhanced embodiment is concerned with solving the collection visit order problem. That is, the problem of applying commands to collections in accordance with execution-order interdependencies among the target collections. For example, CCA invocations that implement software builds must calculate and use a valid visit order to ensure that collections are processed in proper build order.

FIG. 14 shows how Sort Collection Visit Order 152 provides a specific type of sorting service to Sort Collection List 150, which in turn provides a general sorting service to Collection List Producing Means Manager 140.

FIG. 30 shows the example collection tree of FIG. 19, augmented with collection type and visit order data. Note that one collection in the tree "c-library-two" Line 10, contains an explicit visit order value.

FIG. 31 shows an example visit order table for associating collection types with execution visit orders. Column 1 of the table contains collection type indicators that correspond to values found in collection specifier files such as FIG. 3 Line 2. Column 2 contains numeric visit order rankings that establish a partial ordering on the values in Column 1.

FIG. 32 shows an example collection specifier file augmented with an explicit visit order value Line 4 that overrides values obtained from the visit order table of FIG. 31.

FIG. 33 shows an unsorted visit order for the collection tree of FIG. 30, such as might be produced by Get Collection List 141. According to this visit order, collections would be built in sequence from 1-8, beginning with "c-hello" and ending with "c-myphotos". In contrast, Column 2 shows the actual visit order values required for a correct software build. Since the Column 2 values do not appear in correct execution build order, it is easy to see that the visit order ranking of Column 1 will result in a failed software build.

Operation

In operation, Sort Collection List Visit Order Means 152 proceeds according to the simplified algorithm shown in FIG. 34. The collection tree of FIG. 19 and the input file of explicit collection pathnames FIG. 20 will be used to further illustrate the discussion.

First, Visit Order Means 152 receives an unsorted list of target collections as input, usually provided in the form of data structures such as those shown in "collection-info" FIG. 8, "collection-type-definition-info" FIG. 9, and especially "coll-list-prod-info" FIG. 18.

Each collection on the unsorted list of target collections is processed in turn. For each current target collection, Visit Order Means 152 obtains a corresponding collection type indicator FIG. 3 Line 2, FIG. 8 Line 4. The collection type indicator is used as a lookup key into a visit order table FIG. 31 Column 1 to obtain a corresponding numeric visit order value FIG. 31 Column 2. The retrieved numeric visit order value is finally stored with other collection information in the list of target collection data structures, for later use in sorting.

For example, using the collection specifier file of FIG. 3, a collection type indicator value of "cf-web-page" Line 2 would: be retrieved from the collection specifier file; be stored in a target collection data structure; be retrieved from the data structure by Visit Order Means 152; be looked up in the visit order table of FIG. 31 Column 1 Line 4; and would eventually resolve to a numeric visit order lookup value of 100, FIG. 31 Column 2 Line 4.

Sorting collections into proper visit proceeds in two operational phases. The first phase converts collection type indicators into numeric visit order values, and stores the numeric values into data structures for later use. The first phase was described above.

The second phase uses stored numeric visit order values to sort target collections properly according to build order dependencies. Sorting can be done using any sorting algorithm. Many good ones are easily available and are well-known to the art, including shell sorts, tree sorts, insertion sorts, and quicksorts. The particular choice of sorting algorithm is determined by implementation policy.

After determining a numeric visit order value for each target collection on the unsorted list, Visit Order Means 152 sorts the unsorted collections by numeric visit order using a chosen sorting algorithm. Sort results for each sort are stored in a data structure "sorted-colls" FIG. 17. A list of "sorted-colls" FIG. 17 data structures is stored in a "coll-list-prod-info" FIG. 18 Line 5 data structure, which could support multiple sortings if such were desired. In typical practice, however, only one visit order sort is used.

Once sorting is complete, a "coll-list-prod-info" FIG. 18 data structure containing a list of target collections sorted by execution visit order is returned by Collection List Producing Means Manager 140 to the calling module CCA Manager 120, for eventual use in applying commands.

Continuing, the sorted list of collections FIG. 18 is passed into Command Execution Means 160 for use in either direct or indirect command applications.

For direct command applications, Command Execute Sequential Direct Means 161 would visit collections according to the visit orderings stored in the sorted lists of collections FIG. 18 Line 5. By way of example, FIG. 33 shows an example unsorted visit order sequence for the collection tree of FIG. 30. In contrast, FIG. 35 shows the same collections sorted into correct execution visit order sequence, using the visit order sorting techniques described above.

For indirect command applications, Command Execute Sequential Indirect Means 162 would use a sorted list of collections to emit properly ordered command sequences into a script file. By way of example, FIG. 36 shows a script file that uses proper execution visit ordering to visit collections in the collection tree of FIG. 30. Note that the script file visits collections in proper execution visit order, the same order as shown in the sorted visit order of FIG. 35. In contrast, FIG. 26 shows a script file using an unordered visit order sequence.

Named Visit Order Sets

Named visit orders extend the visit order concept by allowing individual collections to participate in multiple different visit orderings.

The problem to be solved is that a set of collections may contain different interdependencies among collections for different computational processes. For example, collection A might depend on collection B for software builds, but collection B might depend on collection A for documentation builds or for exporting data files.

A typical way to model these kinds of relationships is to separate out into separate collections the troublesome collection content that gives rise to the complex dependencies. Then the new fragmented collections can usually be organized into a single visit order scheme.

However, this approach is non-optimal because it may force the partitioning of content that should not be partitioned, and it always results in having to maintain more collections than before.

Named visit order sets are a mechanism for supporting multiple visit orderings in one collection.

FIG. 37 shows an example visit order set name table that associates visit order set names with definition files that provide numeric visit order rankings. Two visit order set names are defined in the table. The first entry "vo-software" is for software builds Line 1, and the second entry "vo-doc" is for documentation builds.

FIG. 38 shows an example named visit order set definition file for software builds. The entry in FIG. 37 Line 1 Column 2 is a reference that points to the definition content shown in FIG. 38.

FIG. 39 shows an example named visit order set definition file for documentation builds. The entry in FIG. 37 Line 2 Column 2 is a reference that points to the definition content shown in FIG. 39.

FIG. 40 is an example collection specifier similar to the specifier in FIG. 32, but further modified to contain multiple named explicit visit orders.

Operation

In operation, named visit order sets are generally used in exactly the same way as is the unnamed visit order set that was first described above.

The main difference between named and unnamed visit order sets is that more information is used to specify a visit order ranking. That is, to represent a visit order ranking software programs must now carry two datums (a visit order set name and a visit order numeric value) whereas before only one datum (the numeric visit order value) was required.

A second minor difference is that program invocations must somehow be told which visit order set name to use. This would normally be implemented using one of the common mechanisms known to the art, such as command line arguments or program configuration options.

For example, consider the collection specifier shown in FIG. 40. The two named visit order set specifications Lines 4-5 are for software build visit orders and for documentation build visit orders. The main idea represented by the dual visit order specifications Lines 4-5 is that the host collection participates in two valid, but different, visit orderings.

For software build operations, a Sort Collection List Visit Order Means 152 would use the "vo-software" FIG. 37 Line 1 visit order name, corresponding to the visit order table of FIG. 38. In this case, the host collection would be sorted using an explicit visit order value of 49.

In contrast, for documentation build operations, a Sort Collection List Visit Order Means 152 would use the "vo-doc" FIG. 37 Line 2 visit order set, corresponding to the documentation visit order set of FIG. 39. In this case, the host collection would be sorted using an explicit visit order value of 10.

Named visit order sets give automated collection processing systems precise control over visit orders used during various processing operations.

Command Execute Parallel Means

Generally speaking, the parallel execution modes described below are identical to the sequential modes described above, with the added benefit of parallelism.

Limits to Parallelism

Three main factors limit the amount of parallelism that can be used in command application: (a) the inherent or problem parallelism within the set of target collections, (b) the physical parallelism available within the computational environment, and (c) administrative limits on the amount of parallelism that can be used.

Problem parallelism is inherently determined by processing interdependencies among the set of target collections. That is, only some collections can be processed in parallel. The maximum number of collections that can be processed in parallel determines the maximum problem parallelism.

Physical parallelism is determined by the physical limits of the computational environment. For example, operating systems usually limit the number of parallel processes that can be created, and computers always limit the number of physical CPU chips that are available for use.

Administrative parallelism is determined by administrative policy. This is because system administrators may want to limit the computational resources that can be accessed by any one parallel computation. For example, parallel calculations can generate significant amounts of computer load, so system administrators may want to protect other system users from big parallel calculations that hog scarce computational resources.

Useful parallelism is the maximum amount of parallelism that can usefully be applied to a particular computation under particular parallelism limits. Suppose that administrative parallelism limits are set high enough to be ignored. Then useful parallelism would be calculated as the minimum of problem parallelism and physical parallelism.

One goal of a parallel computation system is to maximize the amount of useful parallelism applied to a computation. More particularly, the overall goal of CCA parallelism mechanisms is to maximize useful parallelism while preserving execution visit order constraints. This goal is achieved by the mechanisms described below.

Calculation of Parallel Ordering

The first step required for successful parallel execution is the construction of a parallel execution ordering among target collections. Once calculated, the parallel execution ordering can be implemented by various parallel execution means.

For optimum results, a specific parallel ordering should be calculated for each command application (problem parallelism) executed using a particular parallel execution mechanism (physical parallelism). This is because different execution mechanisms may have different parallelism limits.

In practice, however, all available parallel execution mechanisms tend to run on the same computer hardware, so physical parallelism limits tend to remain fairly constant across execution method. Therefore it can sometimes be expedient to use the same parallel ordering calculation for all execution mechanisms. This approximation is particularly true in cases where problem parallelism is low, because physical parallelism becomes even less of an issue.

Figure 42:
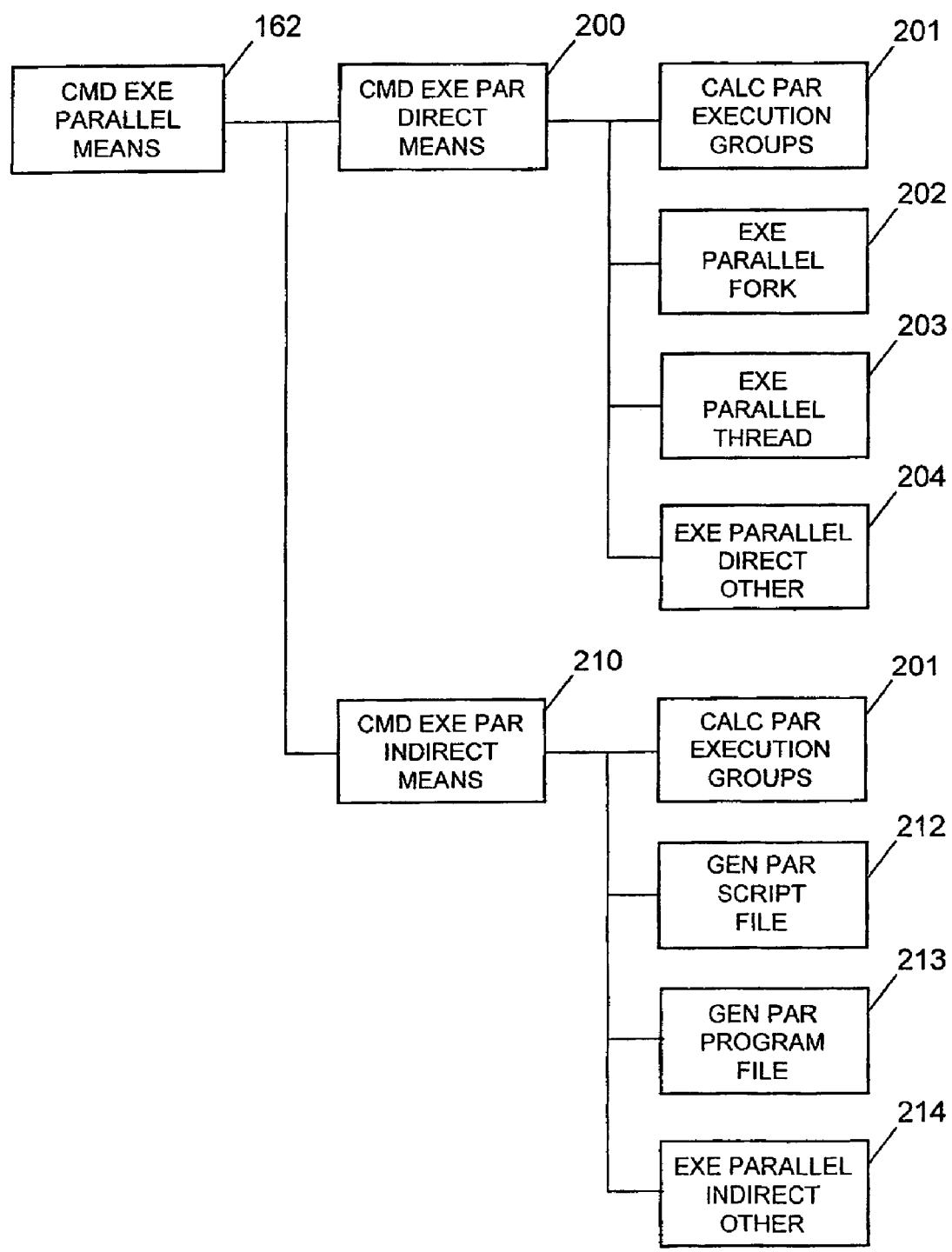
FIG. 42 shows an expanded architecture for a Command Execute Parallel Means FIG. 11 162.

FIG. 42 shows an expanded architecture for a Command Execute Parallel Means FIG. 11 162.

FIG. 41 shows a simplified algorithm for calculating a parallel execution ordering for a set of target collections.

First, algorithm 41 determines three important parallelism limits. Physical and administrative limits are normally obtained from program configuration parameters, but could also be obtained in the form of command line arguments. In both cases, Get Runtime Info 121 is responsible for loading the information into data structures accessible to Calculate Parallel Execution Groups FIG. 42 201. Physical and administrative parallelism limits are calculated by Lines 3-4.

A problem parallelism limit is calculated by using an existing visit order previously calculated by Sort Collection List Visit Order 152. The main principle at work in both visit and parallel orderings is that all collections within the same visit order grouping can normally be executed in parallel. Therefore algorithm FIG. 41 calculates a problem parallelism limit by setting it equal to the number of collections in the largest existing visit order group. A problem parallelism limit is calculated by Lines 5-10.

Next, the algorithm calculates a useful parallelism limit by taking the minimum of the problem, physical, and administrative parallelism limits Lines 11-12. The useful parallelism limit determines the largest practical number of parallel command applications that can be executed in the current computational situation.

Finally, the algorithm calculates a list of parallel execution groups that contain target collections that can be processed in parallel Lines 13-20.

In the case where the problem parallelism limit is lower than both the physical and administrative limits, the problem parallelism limit effectively determines the useful parallelism limit. It follows that the resulting parallel execution ordering will be exactly identical to the original execution visit ordering, because the computational environment can accommodate all the parallelism that is available in the problem set of target collections.

However, in the case where the problem parallelism exceeds the useful parallelism limit, the original visit order groups must be broken down into smaller parallel execution groups that conform to the useful parallelism limit. This reduction in group size is required in order to generate the proper number of parallel applications in each parallel execution group in indirect script files. In these cases, the computational environment cannot accommodate all the parallelism that is available in the problem set of target collections.

Accordingly, the algorithm proceeds by constructing parallel execution groups that are direct copies of the original visit order groups. For each constructed parallel group, the algorithm compares the new group size against the useful parallelism limit. If the new group size exceeds the useful parallelism limit, the algorithm breaks the large group down into smaller groups until no parallel group size exceeds the useful parallelism limit.

Once all target collections have been organized into parallel execution groups with sizes no greater than the useful parallelism limit, the algorithm returns the results to the caller.

Command Execute Parallel Direct Means

FIG. 42 shows an expanded architecture for the Command Execute Parallel Means 162 shown in FIG. 11. Two possible parallel execution modes are possible: direct and indirect. The two parallel modes have the same general characteristics as the sequential versions, respectively, with the obvious exception of sequential versus parallel execution.

Command Execute Parallel Direct Means 200 is generally responsible for directly executing commands, in parallel, on a list of target collections. Calculate Parallel Execution Groups 201 calculates a set of parallel execution groups to satisfy useful parallelism limits, as described above.

Subordinate modules 202-204 perform most of the execution work involved, and represent various technical ways of spawning parallel subprocesses to perform the required command applications.

Execute Parallel Fork Means 202 uses process "forks" to execute provided commands in child or peer computational processes. Forking techniques have been known to the art for many decades, are well-described in the literature, are taught in computer science schools, and can be seen in source code form in many freeware programs on the net.

Execute Parallel Thread Means 203 uses process "threads" to execute provided commands in parallel peer thread processes. For example, one popular threading technique is to start up a pool of threads, and then repeatedly assign and recover pool threads to parallel computations. This method avoids the cost of starting and reaping threads each time a thread is required for a computation. Threading techniques have been known to the art for over one decade, are well described in the literature, are taught in computer science schools, and can be seen in source code form in freeware programs on the net.

Execute Parallel Other Means 204 architecturally represents the idea that other means of executing commands in parallel are also possible and known to the art, including by parallel asyncronous remote procedure calls, by parallel coroutines, by using remote hardware and job servers, and so on.

Operation

In operation, Command Execute Parallel Direct Means 200 proceeds according to the simplified algorithm shown in FIG. 43.

First, the algorithm builds data structures to support the computation. This algorithmic function is shown by FIG. 43 Line 2.

FIG. 44 shows an example "parallel-exe-group" data structure for managing the parallel application of one command to multiple collections, all within one parallel execution group.

FIG. 45 shows an example "cmd-exe-parallel" data structure for managing the parallel application of one command to multiple collections, for all parallel execution groups. This data structure therefore represents the entire parallel computation.

Command Execute Parallel Direct Means 200 calls Calculate Parallel Execution Groups 201 to generate a list of parallel execution groups, using the existing visit ordering for the incoming list of target collections as a guide. This algorithmic function is shown by Lines 3-4. Once the list of parallel execution groups has been calculated and made available in data structure "cmd-exe-parallel" FIG. 45, direct parallel execution can begin.

To perform parallel command application, Command Execute Parallel Direct Means 200 traverses the ordered list of parallel execution groups, in proper parallel execution order. This looping behavior is shown by Lines 5-18.

For each parallel execution group in the list, Command Execute Parallel Direct Means 200 spawns a separate computational subprocess for each collection in the current parallel execution group, using one of the subordinate parallel execution mechanisms 202-204. Each parallel computational subprocess so spawned is responsible for performing command applications on one collection, thereby implementing a 1-to-1 correspondence between target collections within a parallel execution group and parallel subprocesses. The algorithm waits until all parallel subprocesses are completed, and then continues with the next parallel execution group in the list. These algorithmic functions are shown by Lines 7-17.

Finally, after all parallel execution groups have been treated, Command Execute Parallel Direct Means 200 returns overall execution status information to the calling module, Command Execute Parallel Means 162.

A Parallel Execution Group Example

FIG. 46 shows an example parallel execution ordering for collections in the tree of FIG. 30. Maximum useful parallelism for this problem set is 4, assuming that physical and administrative parallelism limits are high enough to be ignored.

Normal execution visit order constraints require that the first two collections FIG. 46 Lines 1-2 be in separate visit order groups in order to ensure a correct software build. Specifically, the first collection has a visit order value of 10, and the second a visit order value of 49. This same constraint also forces the first two collections into separate parallel execution groups.

As a consequence, no useful parallelism can be achieved while processing the first two collections on Lines 1-2. Collection 1 Line 1 must be processed at time 0, and collection 2 Line 2 must be processed at some future time 1, after processing of collection 1 has completed.

In contrast, the second two collections Lines 3-4 can be processed in parallel. Parallel processing is allowed because both collections have the same visit order value of 50. It follows that collections 3 and 4 can be processed in parallel at a future time 2, where time 2 occurs after all subprocesses started at time 1 have completed.

Finally, the last 4 collections Lines 5-9 can be processed in parallel because they all have the same visit order value of 100. Thus collections 5-9 can be processed in parallel at a future time 3, where time 3 occurs after all subprocesses started at time 2 have completed.

The maximum useful parallelism in this example is 4, which corresponds to the largest parallel execution group size. Conveniently, we have ignored possible physical and administrative parallelism limits for this example. Therefore the inherent problem parallelism determined by software build visit order was the limiting factor in determination of a useful parallelism limit.

However, if either physical or administrative parallel limits were lower than 4, the useful parallelism limit would be correspondingly smaller. This would require that the large parallel execution group Lines 5-9 be broken up into smaller groups that satisfied the reduced useful parallelism limit. Where such breaking down of large parallel execution groups is performed, it does not matter which subgroup is executed first, since all collections in all the smaller subgroups have the same original visit order value.

Command Execute Parallel Indirect Means

Command Execute Parallel Indirect Means 210 is generally responsible for indirectly executing commands, in parallel, on the list of target collections. Calculate Parallel Execution Groups 201 calculates a set of parallel execution groups to satisfy useful parallelism limits, as described above.

Subordinate modules 212-214 perform most of the execution work involved, and represent various technical ways of creating executable parallel process descriptions in the form of script files or compilable programs.

Generate Parallel Script File 212 creates a reusable script file in a typical scripting language for the host operating system. The generated script file visits and applies a commands to all collections in the list of target collections, using parallel command execution mechanisms.

Generate Parallel Program File 213 creates a reusable Program file written in a programming language. The generated program file visits and applies commands to all collections in the list of target collections. The main advantage of using a programming language over a scripting language is that programming languages are much more powerful than typical scripting languages. Thus using a programming language enables the generation of more powerful indirect command application files. The main disadvantage of using a programming language is higher overhead costs, because resulting program files must usually be compiled before they can be used.

Execute Parallel Indirect Other Means 214 architecturally represents the idea that other means of indirect parallel command execution are also possible and known to the art, including calling external job control systems that are capable of executing jobs in parallel.

Operation

In operation, Command Execute Parallel Indirect Means 210 proceeds according to the simplified algorithm of FIG. 47.

The algorithm for indirect execution is essentially the same as the algorithm direct execution, with the main exception that the indirect algorithm emits script file syntax for executing a command, rather than executing the command directly. In all other respects, the direct and indirect algorithms are conceptually similar.

FIG. 48 shows an example script file created by a Generate Parallel Script File module 212, using the parallel execution ordering of FIG. 46.

FIG. 48 Line 1 identifies the shell language interpreter as /bin/sh, a common interpreter for Unix computers. Lines 2-7 ensure that at least one command argument is provided for application to target collections. If no arguments are supplied, a short help message is printed.

Lines 8-11 apply the provided commands to the first parallel execution group, which contains only one collection. The "$@" symbol on Line 10 represents the command to be applied. Line 12 represents the application of commands to the second parallel execution group. The second execution group has been omitted to save space, since its structure is identical to the structure of the first execution group Lines 8-11.

Lines 13-20 show a parallel command application to two collections. The "&" (ampersand) symbol Line 15 effectively tells the interpreter to execute the command in parallel, and to immediately continue script execution with subsequent script lines. Line 19 shows a "wait" command that tells the script interpreter to stop execution, and to wait for all parallel commands to complete execution. Once all outstanding parallel commands Lines 15 17 complete, the interpreter continues script execution once again.

Lines 21-32 show a second parallel command application, but this time involving the 4 collections in the last parallel execution group of FIG. 46. When this group of parallel commands completes, the script exits at Line 33.

Nearby Execution Directories

FIG. 49 shows an expanded version of the collection tree of FIG. 19, augmented with two platform directories in each collection to illustrate the typical location of platform directories within collections.

FIG. 50 shows a table containing possible applications where the use of nearby execution directories would be helpful. For example, if a command application was desired for deleting all collections in a subtree Line 5, it would be useful to visit (and execute a deletion command in) the parent directories of all target collections.

As described previously, and as shown by the script files in FIG. 26 and FIG. 36, commands are applied to target collections by changing into a working directory within a target collection, executing a command, and then changing back to a working directory outside of the collection.

Execution directory pathnames such as shown in FIG. 36 Line 7 are typically created by appending a platform name such as "win98.plt" to a collection root directory pathname such as shown in FIG. 20 Line 4. Formulating platform execution directories this way is practical because many commonly applied commands require execution from a platform subdirectory within a collection.

However, not all applied commands can be effectively applied from within a platform directory. Instead, some commands must be executed within a source directory FIG. 49 Line 6 within a collection, or from a parent directory above several collections FIG. 19 Lines 1, 3, 7. For convenience, such directories are called nearby execution directories.

The general problem to be solved is called the nearby execution directory problem. That is, various applied commands must be executed in various nearby execution directories, including platform directories, source directories, parent directories, platform child directories, immediate child directories of parent directories, and so on.

The mechanism described here is a general solution to the nearby execution directory problem.

Operation

In operation, a Get Runtime Information 121 module would obtain nearby directory specifications for the invocation, in the form of command line arguments such as "-parent-dirs" or in the form of invocation or configuration options. Regardless of the information source, Get Runtime Information 121 would make nearby execution directory information available to other modules within a CCA program FIG. 11.

Continuing, Command Execution Means 160 and its subordinate modules would eventually use nearby execution directory information to calculate nearby execution directories, in accordance with the control information obtained and passed on by Get Runtime Information 121. Nearby directories are calculated by modifying the original collection root pathname, by adding, removing, or replacing pathname components.

No specific software module is responsible for providing nearby directory calculation services. This is because modifying pathnames by adding, removing, or replacing pathname components is a trivial, low level software operation that is unworthy of a separate software module description in this disclosure. In practice, modifications are usually made by the currently executing software module, perhaps by using typical software library subroutines designed for the purpose.

Ultimately, Command Execution Means 160 and its subordinate modules use the calculated nearby execution directories as actual execution directories for command applications, thereby enabling CCA programs to apply commands in a broader number of directories and computational situations, and thereby providing a solution to the nearby execution directory problem.

Conclusion

The present collection command applicator invention provides practical solutions to four important problems faced by builders of automated collection processing systems. The four problems are: (1) the general collection command application problem, (2) the collection visit order problem, (3) the parallel collection command execution problem, and (4) the nearby execution directory problem.

In particular, the present collection command applicator invention provides both humans and software programs with a practical, efficient, and scalable means for applying computer commands to large numbers of precisely-determined collections. Importantly, the present invention uses dynamically calculated visit orderings to accommodate dependencies among collections, and uses parallel execution techniques to improve scalable execution performance.

Collection command applicators thus enable both humans and software programs to practically and easily perform automated computations that were not previously possible.

Ramifications

Although the foregoing descriptions are specific, they should be considered as sample embodiments of the invention, and not as limitations. Those skilled in the art will understand that many other possible ramifications can be imagined without departing from the spirit and scope of the present invention.

General Software Ramifications

The foregoing disclosure has recited particular combinations of program architecture, data structures, and algorithms to describe preferred embodiments. However, those of ordinary skill in the software art can appreciate that many other equivalent software embodiments are possible within the teachings of the present invention.

As one example, data structures have been described here as coherent single data structures for convenience of presentation. But information could also be could be spread across a different set of coherent data structures, or could be split into a plurality of smaller data structures for implementation convenience, without loss of purpose or functionality.

As a second example, particular software architectures have been presented here to more strongly associate primary algorithmic functions with primary modules in the software architectures. However, because software is so flexible, many different associations of algorithmic functionality and module architecture are also possible, without loss of purpose or technical capability. At the under-modularized extreme, all algorithmic functionality could be contained in one software module. At the over-modularized extreme, each tiny algorithmic function could be contained in a separate software module.

As a third example, particular simplified algorithms have been presented here to generally describe the primary algorithmic functions and operations of the invention.

However those skilled in the software art know that other equivalent algorithms are also easily possible. For example, if independent data items are being processed, the algorithmic order of nested loops can be changed, the order of functionally treating items can be changed, and so on.

Those skilled in the software art can appreciate that architectural, algorithmic, and resource tradeoffs are ubiquitous in the software art, and are typically resolved by particular implementation choices made for particular reasons that are important for each implementation at the time of its construction. The architectures, algorithms, and data structures presented above comprise one such conceptual implementation, which was chosen to emphasize conceptual clarity.

It follows that there are many possible equivalent implementations of the present invention. Better guides to algorithmic and functional equivalence are the essential inputs, outputs, information associations, and information uses that characterize an algorithm. These characteristics are much more fundamental to a software invention than flexible architectures, simplified algorithms, and particular organizations of data structures.

Practical Applications

Collection command applicators can be used in various practical applications.

One application is to improve the productivity of human computer programmers by providing them with an automated means of applying arbitrary commands to dynamically determined sets of interesting collections.

Another application is to enable the construction of automated collection processing systems that are capable of dynamically applying commands to large numbers of collections that are presented to the automated system.

Another application is perform bulk upgrade modifications to particular sets of interesting collections that are part of a larger set of collections, thereby reducing software maintenance costs.

Another application is to perform bulk software build operations on large software systems composed of many interdependent collections.

Other applications can also be imagined by those skilled in the art.

Functional Enhancements

One possible functional enhancement is to provide a graphical user interface for a collection command applicator, and to collect real-time status information from command applications for display on the GUI. This would allow human users to specify collection selection criteria, to specify command application information, to initiate command application, and to monitor ongoing status results during execution.

Collection List Producing Means

The foregoing disclosure described both explict and collection recognizer means for obtaining lists of collections to visit. However, many other methods of obtaining target collection lists are also possible.

For example, collections could be specified by interactive keyboard or mouse selection means, by providing collection names on invocation command lines, by obtaining collection names from a network collection name server, by retrieving collection names from a database means, or by algorithmically calculating a set of collection names.

Collection vs. Directory Recognition

In one important alternative embodiment, a list of collection names is not used by a CCA program to determine a set of execution directories. Instead, a Collection List Producing Means 140 uses simple explicit filename or directory names in search expressions, to identify matching directories or files within a search subtree. For example, a collection list producing means could directly search for all directories named "win98.plt" within a specified set of subtrees.

Having obtained a list of such file or directory pathnames, a CCA program could use the pathnames in two ways. First, pathnames could be used as anchor reference pathnames for use in nearby directory calculations. Or second, the pathnames could be used as the ultimate execution directories themselves.

Using pathnames as reference anchors for nearby directory calculations or for ultimate execution directories allows collection command applicators to function independently of collections, since no collection information is used during such command application operations.

Collection Visit Ordering Means

The foregoing disclosure described collection list sorting means that were based on alphabetic names or numeric visit order values. However, other methods of determining visit order are also possible.

For example, dynamic visit orders could be calculated using collection size, collection content, depth within a subtree, or filesystem attributes such as last modified timestamps. Furthermore, explicit visit orders could be entered as command line invocation options, or as configuration options.

In principle, visit orders can be determined using any interesting attribute of the collections being sorted.

Command Execution Means

The foregoing disclosure described direct command execution primarily in terms of process forks and threads. However, other means of initiating and managing computational processes are also possible.

For example, remote procedure calls, interrupts, signals, coroutines, remote method servers, applets, network servers, and distributed network job management systems are all methods well known to the art. Specific choices of execution methods are determined by implementation policy.

For indirect command execution, other ramifications are also possible. In one possible embodiment, a CCA program could execute a script or program file immediately after it was generated. This approach would combine the advantages of immediate execution from direct execution with the benefit of persistent, reusable scripts or program files from indirect execution.

Alternative Implementations

Each software component identified above may optionally reside on a separate computer to form a distributed implementation. Distributed implementations would be necessarily more complex, and would require the use of normal network protocols to carry information among distributed components. However, if distributed implementations are not desired, all components may reside on the same computer.

Data structures have been described here as coherent single structures for presentation clarity. However, other implementations are also possible. For example, information could be split into a plurality of smaller data structures for implementation or communication convenience, without loss of functionality.

As can be seen by one of ordinary skill in the art, many other ramifications are also possible within the teachings of this disclosure.

Scope

The present invention is not limited to any particular computer architecture, operating system, filesystem, database, or other software implementation.

Therefore the full scope of the present invention should be determined by the accompanying claims and their legal equivalents, rather than from the examples given in the specification.

I claim:

1. A computer-based method for automating the processing of one or more collections comprising:
   obtaining a list of said one or more collections;
   determining a proper execution dependency visit order;
   determining a parallel execution order;
   applying one or more commands to at least one collection in the list of said one or more collections in accordance with said proper execution dependency visit order and said parallel execution order;
   generating a script file based on said proper execution dependency visit order and said parallel execution order for processing collections; and
   storing said script file with said one or more collections,
   wherein collections are data structures comprised of a collection specifier and collection content containing zero or more collection content files, and wherein a collection specifier contains information about a collection instance.

2. The method of claim 1 wherein applying one or more commands includes executing one or more commands in a sequential order.

3. The method of claim 1 wherein applying one or more commands includes executing one or more commands in a parallel order.

4. The method of claim 1 wherein applying one or more commands includes determining ultimate command execution directories.

5. The method of claim 4 wherein determining ultimate command execution directories is based at least in part on a nearby execution directory technique.

6. The method of claim 1, wherein determining a parallel execution order is accomplished by determining an optimal parallel execution order.

7. The method of claim 1, wherein determining a parallel execution order is accomplished by determining a near-optimal parallel execution order.

8. The method of claim 1, wherein determining a parallel execution order is accomplished by determining a sub-optimal parallel execution order.

9. A method for automating the processing of one or more collections comprising:
   selecting said one or more collections;
   determining a proper execution dependency visit order;
   determining a parallel execution order; and
   applying one or more commands to said one or more collections in accordance with said proper execution dependency visit order and said parallel execution order,
   wherein collections are data structures comprised of a collection specifier and collection content containing zero or more collection content files, and wherein a collection specifier contains information about a collection instance including at least a collection name and a collection type indicator.

10. A system for automating the processing of one or more collections comprising:
    a memory configured to store a list of said one or more collections; and
    a processor, coupled to the memory, configured to:
    obtain a list of said one or more collections;
    determine a proper execution dependency visit order;
    determine a parallel execution order; and
    apply one or more commands to said one or more collections in the list of said one or more collections in accordance with said proper execution dependency visit order and said parallel execution order;
    wherein collections are data structures comprised of a collection specifier and collection content containing zero or more collection content files, and wherein a collection specifier contains information about a collection instance.

11. The system of claim 10 wherein applying one or more commands includes executing one or more commands in a sequential order.

12. The system of claim 10 wherein applying one or more commands includes executing one or more commands in a parallel order.

13. The system of claim 10 wherein applying one or more commands includes determining ultimate command execution directories.

14. The system of claim 10 wherein the processor is further configured to generate one or more script files.

* * * * *